(12) United States Patent
Risheq et al.

(10) Patent No.: US 8,005,513 B2
(45) Date of Patent: Aug. 23, 2011

(54) CELL PHONE SIGNAL BOOSTER

(75) Inventors: Tareq A. Risheq, Laguna Niguel, CA (US); Craig A. Walsh, Folsom, CA (US); Kenneth D. Wong, Folsom, CA (US); Paul W. Clark, Folsom, CA (US)

(73) Assignee: Cellynx, Inc., Valeiycia, CA (US)

( * ) Notice: Subject to any disclaimer, the term of this patent is extended or adjusted under 35 U.S.C. 154(b) by 887 days.

(21) Appl. No.: 11/625,331

(22) Filed: Jan. 21, 2007

(65) Prior Publication Data

US 2007/0218951 A1 Sep. 20, 2007

Related U.S. Application Data

(60) Provisional application No. 60/767,313, filed on Mar. 16, 2006, provisional application No. 60/803,007, filed on May 23, 2006, provisional application No. 60/806,103, filed on Jun. 29, 2006, provisional application No. 60/807,436, filed on Jul. 14, 2006.

(51) Int. Cl.
*H04B 1/38* (2006.01)
*H04M 1/00* (2006.01)

(52) U.S. Cl. ...................................... 455/571

(58) Field of Classification Search .................. 455/7, 9, 455/571

See application file for complete search history.

(56) References Cited

U.S. PATENT DOCUMENTS

| | | |
|---|---|---|
| 3,450,841 A | 6/1969 | Zeiser et al. |
| 4,150,334 A | 4/1979 | Williams |
| 4,231,116 A | 10/1980 | Sekiguchi et al. |
| 4,704,733 A | 11/1987 | Kawano |
| 4,754,495 A | 6/1988 | Kawano et al. |
| 4,849,963 A | 7/1989 | Kawano et al. |
| 4,972,346 A | 11/1990 | Kawano et al. |
| 5,231,407 A | 7/1993 | McGirr et al. |

(Continued)

FOREIGN PATENT DOCUMENTS

GB 2386012 A1 9/2003

(Continued)

OTHER PUBLICATIONS

Chevillat, Pierre R., et al., Optimum FIR Transmitter and Receiver Filters for Data Transmission over Band-Limited Channels, IEEE Transactions on Communications, vol. COM-30, No. 8, Aug. 1982, pp. 1909-1915.

(Continued)

*Primary Examiner* — Pierre-Louis Desir
*Assistant Examiner* — Joshua Schwartz
(74) *Attorney, Agent, or Firm* — Fish & Associates, PC

(57) ABSTRACT

A system and a method achieve a higher level of stable gain for a cellular telephone booster (repeater) than previously considered to be achievable. An RF signal booster includes active stability control provided by an active stability network. The active stability network decreases the amount of radiated or conducted parasitic signal coupled from the output of an amplifier back to the input of the amplifier. The active stability network allows a higher system gain than would otherwise be achievable. In one embodiment, the active stability network (stabilization network) includes an RF sample coupler, one or more band pass filters, a vector modulator, an RF recombining coupler and an RF detection circuit. An algorithm controls the stabilization network to minimize the amount of parasitic coupled signal from the output of the amplifier back to the input of the amplifier and to maximize the achievable system gain.

10 Claims, 14 Drawing Sheets

U.S. PATENT DOCUMENTS

| | | | |
|---|---|---|---|
| 5,392,009 | A | 2/1995 | Talwar |
| 5,548,838 | A | 8/1996 | Talwar et al. |
| 5,920,286 | A | 7/1999 | Mohebbi |
| 5,929,776 | A * | 7/1999 | Warble et al. ............ 340/7.32 |
| 6,032,020 | A | 2/2000 | Cook et al. |
| 6,640,110 | B1 | 10/2003 | Shapira et al. |
| 6,788,261 | B1 | 9/2004 | Buren |
| 6,838,928 | B2 | 1/2005 | Mihara |
| 6,853,243 | B2 | 2/2005 | Sekine et al. |
| 7,091,782 | B2 | 8/2006 | Jacob |
| 7,123,676 | B2 | 10/2006 | Gebara et al. |
| 2002/0103013 | A1 | 8/2002 | Watson et al. |
| 2004/0097189 | A1 * | 5/2004 | Bongfeldt et al. ............ 455/7 |
| 2004/0106381 | A1 | 6/2004 | Tiller |
| 2004/0110469 | A1 | 6/2004 | Judd et al. |
| 2004/0166802 | A1 | 8/2004 | McKay et al. |
| 2005/0030884 | A1 | 2/2005 | Kim et al. |
| 2005/0110563 | A1 * | 5/2005 | Rabinovich et al. ........ 330/52 |
| 2005/0130587 | A1 | 6/2005 | Suda et al. |
| 2005/0221875 | A1 | 10/2005 | Grossman et al. |
| 2006/0052066 | A1 | 3/2006 | Cleveland et al. |
| 2006/0058071 | A1 | 3/2006 | Buren et al. |
| 2006/0172781 | A1 | 8/2006 | Mohebbi |

FOREIGN PATENT DOCUMENTS

| | | |
|---|---|---|
| JP | 9-247034 A | 9/1997 |
| JP | 2003-307533 A | 10/2003 |
| WO | 2004095763 | 4/2004 |
| WO | 2004095763 A2 | 11/2004 |
| WO | 2004095763 A3 | 1/2005 |
| WO | 2005025078 A2 | 3/2005 |
| WO | 2005069249 A1 | 7/2005 |

OTHER PUBLICATIONS

Filardo et al., "Microprocessor Controlled RF Modulator Apparatus," United States Statutory Invention Registration H481, Jun. 7, 1988.

Lee, Duck-jae, et al., "Design of the monoblock duplexer for the application of cellular band repeater," Proceedings of 2001 International Conferences on Info-Tech and Info-Net, ICII 2001, Beijing, Oct. 29-Nov. 1, 2001, pp. 621-625.

Streng, V., et al., "Coverage Enhancement through Two-hop Relaying in Cellular Radio Systems," Thesis, Carleton University, Ottawa, Ontario, Canada, 2002, 99 pages.

Streng, V., "Coverage Enhancement Through Two-hop Relaying in Cellular Radio Systems," Wireless Communications and Networking Conference, 2002, WCNC2002, IEEE, Mar. 2002, pp. 881-885.

"Notification of Transmittal of the International Search Report and the Written Opinion of the International Searching Authority, or the Declaration" (Form PCT/ISA/220), "PCT International Search Report" (Form PCT/ISA/210), and "PCT Written Opinion of the International Searching Authority" (Form PCT/ISA/237), mailed on Feb. 19, 2008, by ISA/US Authorized Officer Blaine Copenheaver in corresponding International Application No. PCT/US2007/60827, 10 pages total.

* cited by examiner

Rx ANTENNA RADIATION PATTERN

Tx ANTENNA RADIATION PATTERN

CELL PHONE SIGNAL BOOSTER

RELATED APPLICATIONS

The present application claims the benefit of priority under 35 U.S.C. §119(e) to the following provisional applications:

U.S. Provisional Application No. 60/767,313, filed on Mar. 16, 2006;

U.S. Provisional Application No. 60/803,007, filed on May 23, 2006;

U.S. Provisional Application No. 60/806,103, filed on Jun. 29, 2006; and

U.S. Provisional Application No. 60/807,436, filed on Jul. 14, 2006.

BACKGROUND OF THE INVENTION

1. Field of the Invention

The present invention relates generally to the wireless communication industry, and, more specifically, relates to a wireless cell phone signal booster (repeater).

2. Description of Related Art

Cellular telephones have limited ranges for receiving signals from cellular towers and for transmitting signals to cellular towers. When a cellular telephone is in a fringe area (e.g., an area located a substantial distance away from the nearest tower or an area located near obstacles that partially block cellular signals), the user of the telephone may not have any reception or may have very poor reception. Generally, the reception could be improved if the cellular telephone had more power; however, the power is limited by regulations and by the size of the telephone.

In some applications, radio frequency (RF) signal boosters (repeaters) can be used. RF signal boosters receive, amplify and simultaneously re-transmit radiated RF signals with no frequency conversion. Historically, the signal amplification (gain) performance of such devices has been determined by the amount of isolation that can be achieved between transmit and receive antennas. If the gain exceeds the amount of isolation between transmit and receive antennas, the RF amplifier will become unstable (e.g., oscillate), thereby causing unwanted spurious signals to be generated. Since cellular telephones are often used in offices, houses or vehicles where only a limited amount of space is available for placement of the transmit and receive antennas, it previously was considered impractical or infeasible to provide a signal booster for a cellular telephone system.

SUMMARY OF THE INVENTION

A system and a method achieve a higher level of stable gain for a cellular telephone booster (repeater) than previously considered to be achievable. An RF signal booster includes active stability control provided by an active stability network, which operates at the RF frequency, thereby eliminating the need for frequency conversion. Frequency conversion may be included as a method for achieving band limiting performance, if desired, but is not necessary for this method of stability control. The active stability network decreases the amount of radiated or conducted parasitic signal coupled from the output of an amplifier back to the input of the amplifier. The active stability network allows a higher system gain than would otherwise be achievable.

In an illustrated embodiment, the active stability network (stabilization network) includes an RF sample coupler, one or more matching band pass filters, a vector modulator, an RF recombining coupler and an RF detection circuit. An algorithm controls the stabilization network to minimize the amount of parasitic coupled signal from the output of the amplifier back to the input of the amplifier and to maximize the achievable system gain.

In accordance with one aspect of certain embodiments in accordance with the present invention, a cellular telephone signal booster system comprises a first antenna that receives remote incoming cellular signals at a first frequency from a remote cellular site and that transmits remote outgoing cellular signals to the remote cellular site at a second frequency. The system further comprises a second antenna that transmits local outgoing cellular signals responsive to the remote incoming cellular signals to a local cellular telephone at the first frequency and that receives local incoming cellular signals from the local cellular telephone at the second frequency. A first RF amplifier is responsive to the remote incoming cellular signals from the first antenna at the first frequency to provide the local outgoing cellular signals at the first frequency to the second antenna. A second RF amplifier is responsive to the local incoming cellular signals from the second antenna at the second frequency to provide the remote outgoing cellular signals at the second frequency to the first antenna. A first active stability network operating at the first frequency decreases the amount of radiated or conducted parasitic signal coupled from the output of the first amplifier back to the input of the first amplifier. A second active stability network operating at the second frequency decreases the amount of radiated or conducted parasitic signal coupled from the output of the second amplifier back to the input of the second amplifier.

Preferably, the first active stability network comprises an RF sample coupler that produces a sampled RF signal responsive to the local outgoing cellular signal provided to the second antenna. A vector modulator receives the sampled RF signal and that produces a vector modulated signal. A set of band pass filters, which matches a set of band pass filters used in the first RF amplifier path are used in conjunction with the vector modulator to produce a band limited signal. Band pass filtering of both the sampled signal path as well as the RF amplifier path maintains overall amplifier loop stability to control out-of-band loop gain of both paths. Additionally, the utilization of a set of matched band pass filters allows for matched group delay between these paths thereby resulting in broadband performance. An RF combining coupler combines the band pass filtered sample signal with the remote incoming cellular signal from the first antenna and with the parasitic coupled signal from the second antenna to produce a combined signal. The combined signal is inputted to a first low noise RF amplifier stage to minimize adverse effects on noise figure. The RF signal is subsequently band pass filtered, amplified and selectively attenuated to maximize the gain, while maintaining overall gain stability. An RF detection circuit monitors the output of the first RF amplifier to detect the power output of the first RF amplifier. A controller responsive to the output of the RF detection circuit adjusts the active stability network to minimize the effect of the parasitic coupled signal on the output of the first RF amplifier.

Also preferably, the second active stability network comprises an RF sample coupler that produces a sampled RF signal responsive to the remote outgoing cellular signal provided to the first antenna. A vector modulator receives the sampled RF signal and produces a vector modulated signal. A set of band pass filters, which matches a set of band pass filters used in the second RF amplifier path, are used in conjunction with the vector modulator to produce a band limited signal. Band pass filtering of both the sampled signal path as well as the RF amplifier path maintains overall amplifier loop stability to control out-of-band loop gain of both paths. Additionally, the utilization of a set of matched band pass filters allows for matched group delay between these paths thereby resulting in broadband performance. An RF combining coupler combines the band pass filtered signal with the local incoming cellular signal from the second antenna and with the parasitic coupled signal from the first antenna to produce a combined signal. The combined signal is inputted to a first low noise RF amplifier stage to minimize adverse effects on noise figure. The RF signal is subsequently band pass filtered, amplified and selectively attenuated to maximize the gain, while maintaining overall gain stability. An RF detection circuit monitors the output of the second RF amplifier to detect the power output of the second RF amplifier. A controller responsive to the output of the RF detection circuit adjusts the active stability network to minimize the effect of the parasitic coupled signal on the output of the second RF amplifier.

Preferably, in an aspect in accordance with a full duplex embodiment, the first active stability network comprises a first RF sample coupler that produces a first sampled RF signal responsive to the local outgoing cellular signal provided to the second antenna. A first vector modulator receives the first sampled RF signal and produces a first vector modulated signal. A set of band pass filters, which matches a set of band pass filters used in the first RF amplifier path, are used in conjunction with the vector modulator to produce a band limited signal. Band pass filtering of both the sampled signal path as well as the RF amplifier path maintains overall amplifier loop stability to control out-of-band loop gain of both paths. Additionally, the utilization of a set of matched band pass filters allows for matched group delay between these paths thereby resulting in broadband performance. A first RF combining coupler combines the first band pass filtered signal with the remote incoming cellular signal from the first antenna and with the first parasitic coupled signal from the second antenna to produce a first combined signal. The combined signal is inputted to a first low noise RF amplifier stage to minimize adverse effects on noise figure. The RF signal is subsequently band pass filtered, amplified and selectively attenuated to maximize the gain, while maintaining overall gain stability. A first RF detection circuit monitors the output of the first RF amplifier to detect the power output of the first RF amplifier. A first controller responsive to the output of the first RF detection circuit adjusts the first active stability network to minimize the effect of the first parasitic coupled signal on the output of the first RF amplifier. In accordance with this preferred full duplex embodiment, the second active stability network comprises a second RF sample coupler that produces a second sampled RF signal responsive to the remote outgoing cellular signal provided to the first antenna. A second vector modulator receives the second sampled RF signal and produces a second vector modulated signal. A second set of band pass filters, which matches a set of band pass filters used in the second RF amplifier path, are used in conjunction with the second vector modulator to produce a band limited signal. Band pass filtering of both the sampled signal path as well as the RF amplifier path maintains overall amplifier loop stability to control out-of-band loop gain of both paths. Additionally, the utilization of a set of matched band pass filters allows for matched group delay between these paths thereby resulting in broadband performance. A second RF combining coupler combines the second band pass filtered sample signal with the local incoming cellular signal from the second antenna and with the second parasitic coupled signal from the first antenna to produce a second combined signal. The combined signal is inputted to a second Low noise RF amplifier stage to minimize the effects of loss on noise figure. The RF signal is subsequently band pass filtered, amplified and selectively attenuated to maximize the gain, while maintaining overall gain stability. A second RF detection circuit monitors the output of the second RF amplifier to detect the power output of the second RF amplifier. A second controller responsive to the output of the second RF detection circuit adjusts the second active stability network to minimize the effect of the second parasitic coupled signal on the output of the second RF amplifier. Preferably, the first controller and the second controller comprise respective control programs in a microcontroller. In certain advantageous embodiments, the first controller and the second controller comprise respective control programs in a single microcontroller.

In accordance with another aspect of certain embodiments in accordance with the present invention, a system for providing a stable gain for a cellular telephone signal booster between a receiving antenna and a transmitting antenna comprises an RF amplifier that provides amplified output signals to the transmitting antenna in response to signals received via the receiving antenna. The system further comprises an active stability network that decreases the amount of radiated or conducted parasitic signal coupled from the output of the amplifier back to the input of the amplifier. The active stability network comprises an RF sample coupler that samples the amplified output signals and produces a sampled RF signal. A vector modulator receives the sampled RF signal and produces a vector modulated signal. At least one band pass filter receives the vector modulated signal and produces a band pass filtered signal. An RF combining coupler combines the band pass filtered signal with an incoming signal that includes the parasitic signal to produce a combined signal. A variable attenuator selectively attenuates the combined signal and provides a selectively attenuated signal to the input of the RF amplifier. An RF detection circuit monitors the output of the RF amplifier to detect the power output of the RF amplifier. A controller responsive to the output of the RF detection circuit selectively adjusts the vector modulator and the variable attenuator to minimize the effect of the parasitic coupled signal.

Preferably, the controller comprises a microcontroller that receives an input signal responsive to the magnitude of the output of the RF amplifier and that incrementally adjusts at least one control input of the vector modulator to adjust the phase of the vector modulated signal. The microcontroller is further responsive to the magnitude of the RF amplifier to adjust a control input to the variable attenuator to selectively attenuate the amplitude of the combined signal.

In accordance with another aspect of certain embodiments in accordance with the present invention, a method provides a stable gain for a cellular telephone booster by decreasing the amount of radiated or conducted parasitic signal coupled from the output of an amplifier back to the input of the amplifier. The method comprises sampling the output of the amplifier using an RF sample coupler to produce a sampled signal. The method further comprises applying vector modulation to the sampled signal to produce a vector modulated signal. The method further comprises band pass filtering the sampled signal to produce a band pass filtered signal. The method further comprises combining the band passed filtered signal with an input signal to produce a combined signal. The method further comprises providing the combined signal as the input of the amplifier. The method further comprises applying a selective attenuation to the amplified signal to provide gain controlled signal. The method further comprises monitoring the RF power output of the amplifier and adjusting the vector modulation and the selective attenuation in response to the RF power output to minimize the amount of parasitic coupled signal.

Preferably, the method of providing a stable gain for a cellular telephone booster further comprises applying an initial selective attenuation to a variable attenuator. The method further comprises applying an initial in-phase (I) value to a vector modulator. The method further comprises applying an initial quadrature (Q) value to the vector modulator. The method further comprises determining an expected RF power output. The method further comprises comparing a detected RF power output to the expected RF power output. In accordance with this aspect of the preferred method, when the detected RF power output differs from the expected RF power output by more than a predetermined amount, the method further comprises incrementally adjusting the in-phase value within a predetermined range about the initial in-phase value and detecting the RF power for each in-phase value until the detected RF power no longer differs from the expected RF power by more than the predetermined amount or until the in-phase value is outside the predetermined range. When the in-phase value is outside the predetermined range, the method comprises incrementally adjusting the quadrature value within a predetermine range about the initial quadrature value and repeating the incremental adjusting of the in-phase value within the predetermined range about the initial in-phase value until the detected RF power no longer differs from the expected RF power by more than the predetermined amount or until the quadrature value is outside the predetermined range. The method further comprises adjusting the selective attenuation to a new attenuation when the detected RF power differs by more than the predetermined amount for all values of the in-phase value and the quadrature value within the respective predetermined ranges of value, and repeating the incremental adjusting of the in-phase value and the quadrature value at the new attenuation. In accordance with this aspect of the preferred method, when the detected RF power output does not differ from the expected RF power by more than a predetermined amount, the method further comprises delaying for a predetermined time and then adjusting the attenuation to a new attenuation value and repeating the adjusting of the in-phase value and the adjusting of the quadrature value at the new attenuation value.

BRIEF DESCRIPTION OF THE DRAWINGS

Certain aspects in accordance with embodiments of the present invention are described below in connection with the accompanying drawing figures in which.

DETAILED DESCRIPTION OF PREFERRED EMBODIMENTS

Figure 1:
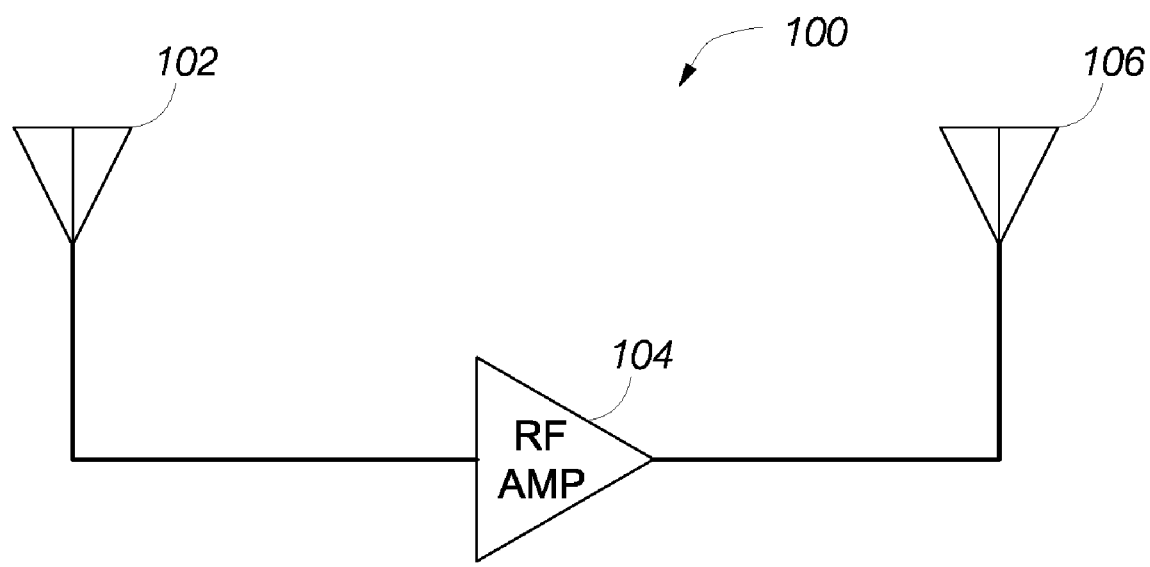
FIG. 1 illustrates a basic RF signal booster.

A radiated RF signal booster (referred to herein as the system) is a real-time repeater that is capable of receiving, amplifying and retransmitting radiated RF signals without frequency conversion. As illustrated in FIG. 1, a basic radiated RF signal booster 100 comprises a receive antenna 102, an RF amplifier 104 and a transmit antenna 106.

Figure 2:
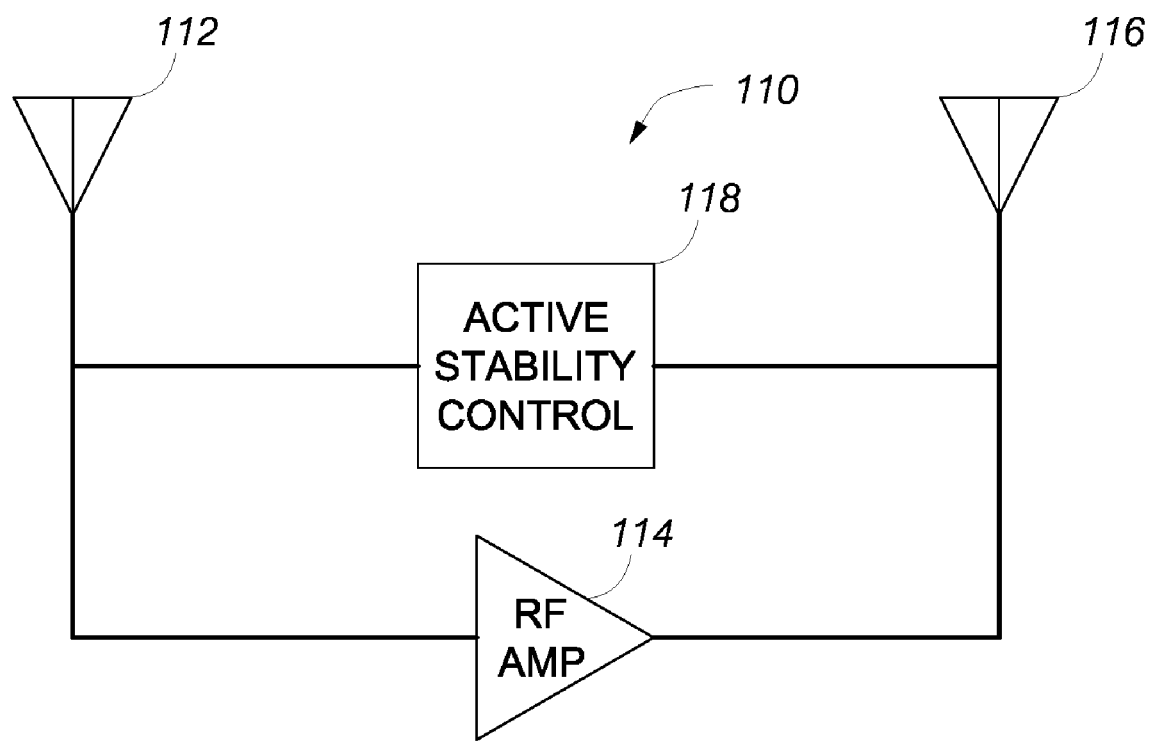
FIG. 2 illustrates the RF signal booster of FIG. 1 modified to include active stability control.

As illustrated in FIG. 2, a radiated RF signal booster 110 in accordance with aspects of the present invention includes a receive (Rx) antenna 112, an RF amplifier 114 and a transmit (Tx) antenna 116 similar to the components of the basic radiated RF signal booster 100 of FIG. 1. The RF signal booster 110 further includes a gain stabilization network (ACTIVE STABILITY CONTROL) 118 that allows the RF signal booster 110 to achieve a higher level of performance than would otherwise be possible. The gain stabilization network 118 enables a method of enhancing the performance of the RF signal booster 110.

As described below, the gain stabilization network 118 comprises electronic components that reduce the amount of undesirable radiated parasitic signal coupled from the Tx antenna 116 back to the Rx antenna 112 of the radiated RF signal booster 110. Reducing the amount of coupled radiated RF signal permits higher system gain, which provides improved area coverage of the RF signal booster 110 in comparison to a conventional RF signal booster (e.g., the RF signal booster 100 of FIG. 1). In the illustrated embodiments, the active stability network operates at the RF frequency, thereby eliminating the need for frequency conversion. Although frequency conversion may be included in other embodiments as a method for achieving band limiting performance, if desired, frequency conversion is not necessary for the method of stability control illustrated herein.

For any amplifier, positive feedback of the output signal back to the input of the amplifier may cause the amplifier to become unstable. As a result unwanted spurious signals may be produced by the amplifier, which render the amplifier unusable as a linear amplifier. For a non-inverting amplifier, a condition for instability is:

Loop back Gain (Magnitude)=1; and
Loop back Phase=0 (degrees)

Whenever the foregoing condition is met, the output signal and the input signal combine together constructively, which causes the amplifier to become unstable (e.g., the amplifier oscillates). For any amplifier, the non-unilateral performance can be characterized as output to input isolation (reverse isolation). The overall isolation performance of an amplifier is a combined effect of both conducted signal isolation and radiated signal isolation. Typically, for a radiated RF signal booster, the radiated signal isolation dominates and therefore defines the limitations of the system performance.

Figure 3:
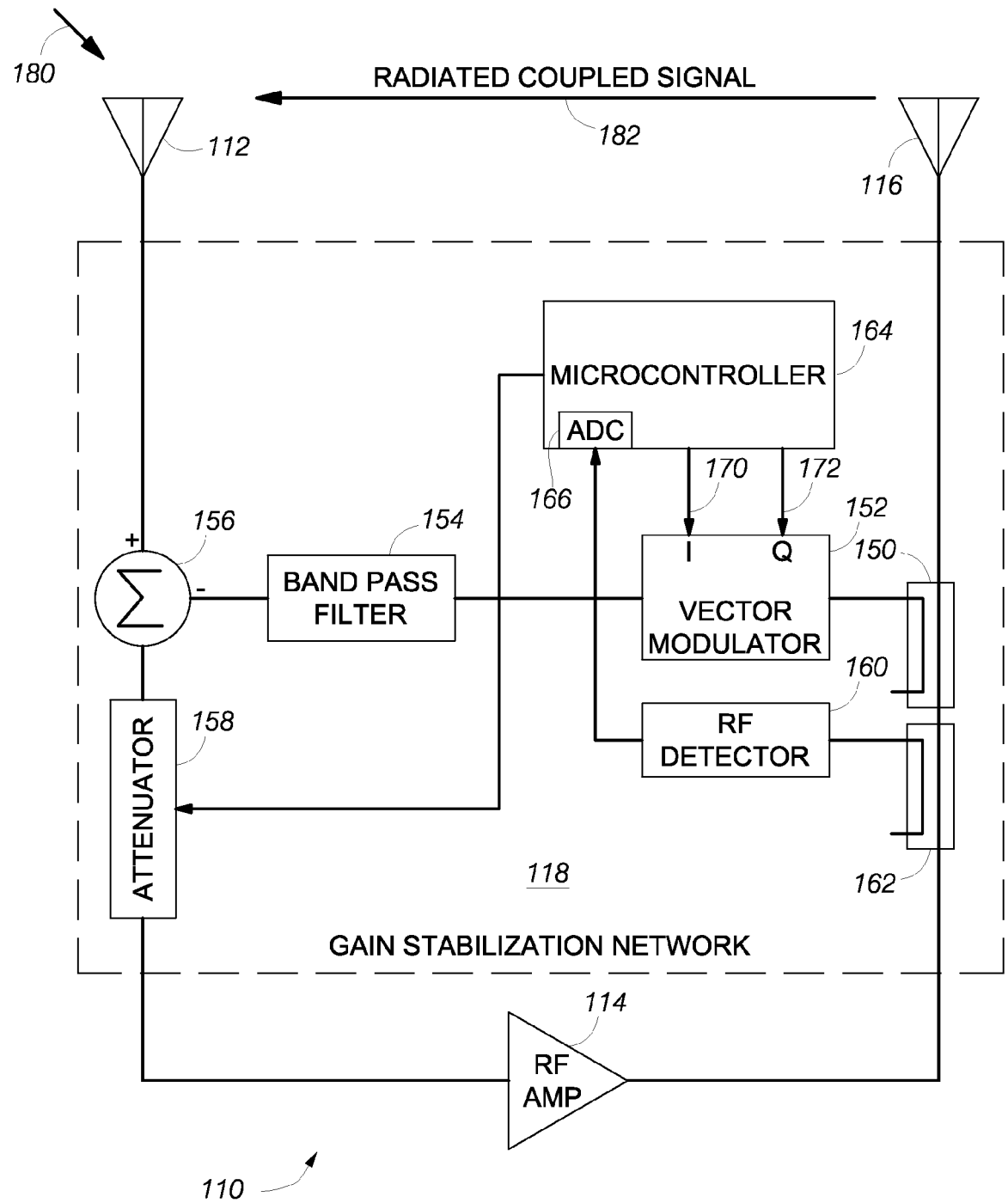
FIG. 3 illustrates additional details of the active stability control in the RF signal booster of FIG. 2.
Figure 4A:
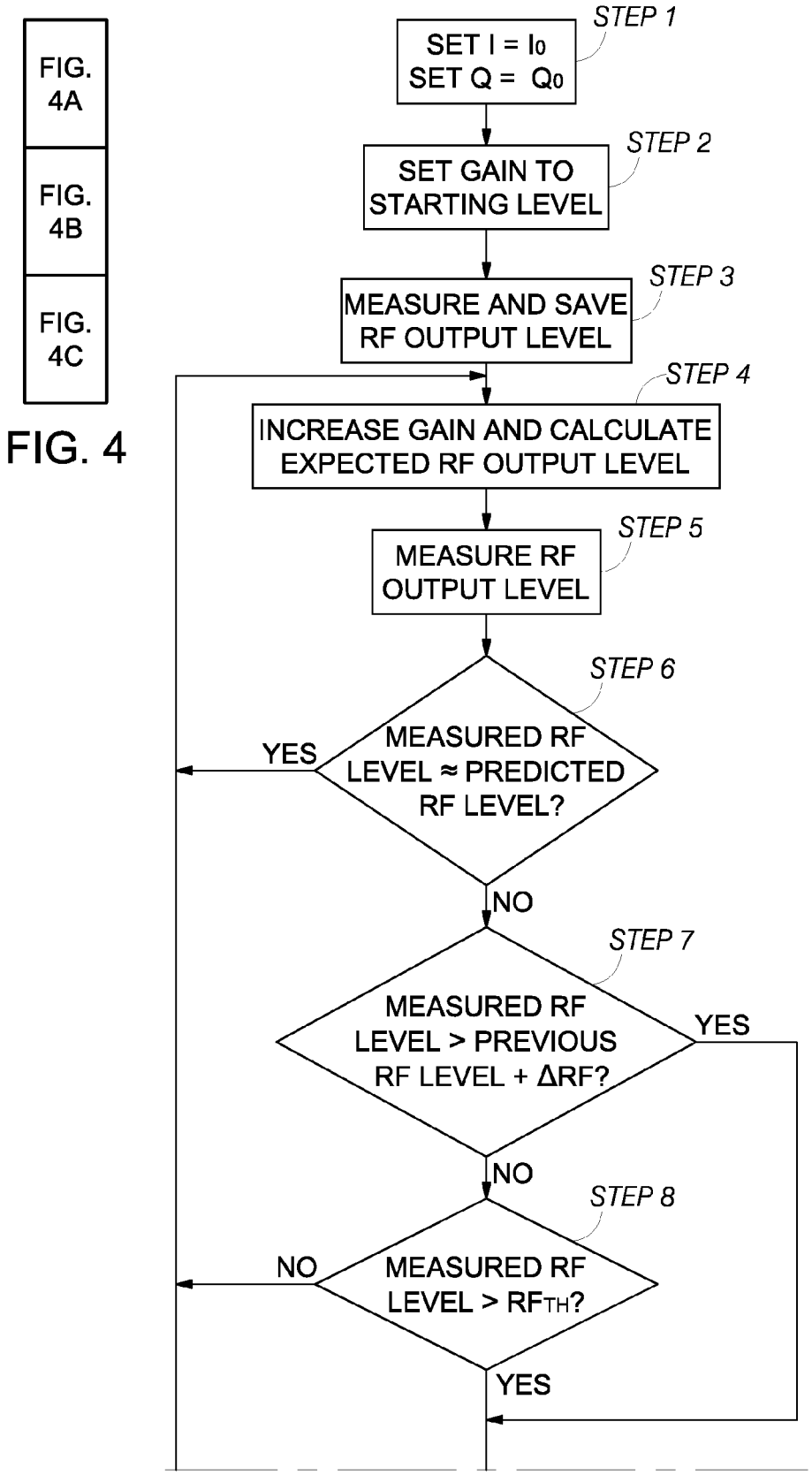
FIG. 4 (comprising FIGS. 4A, 4B and 4C) illustrates a flow chart of the algorithm performed by the microcontroller of FIG. 3 to control the vector modulator and attenuator to obtain and maintain gain stabilization.
Figure 4B:
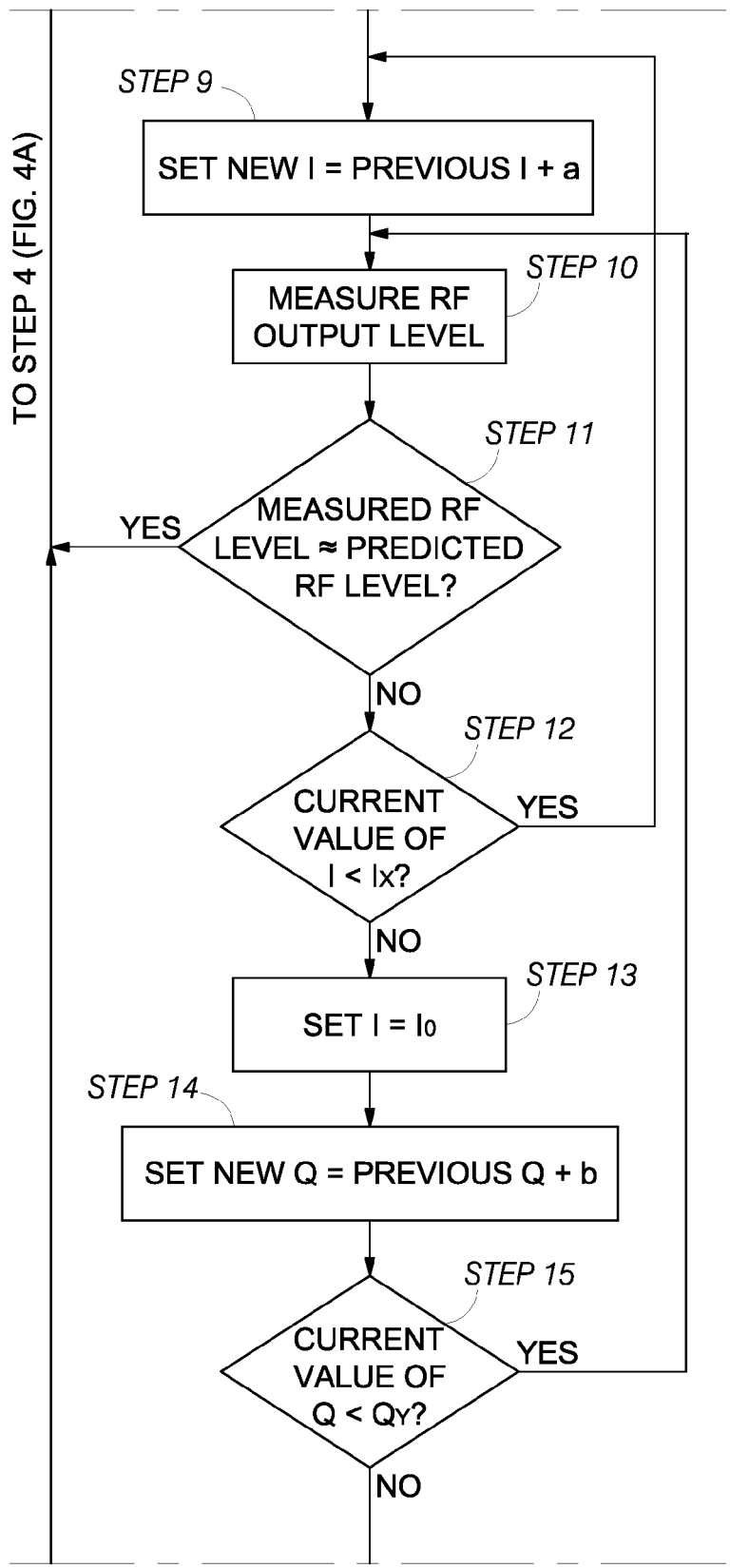
Figure 4C:
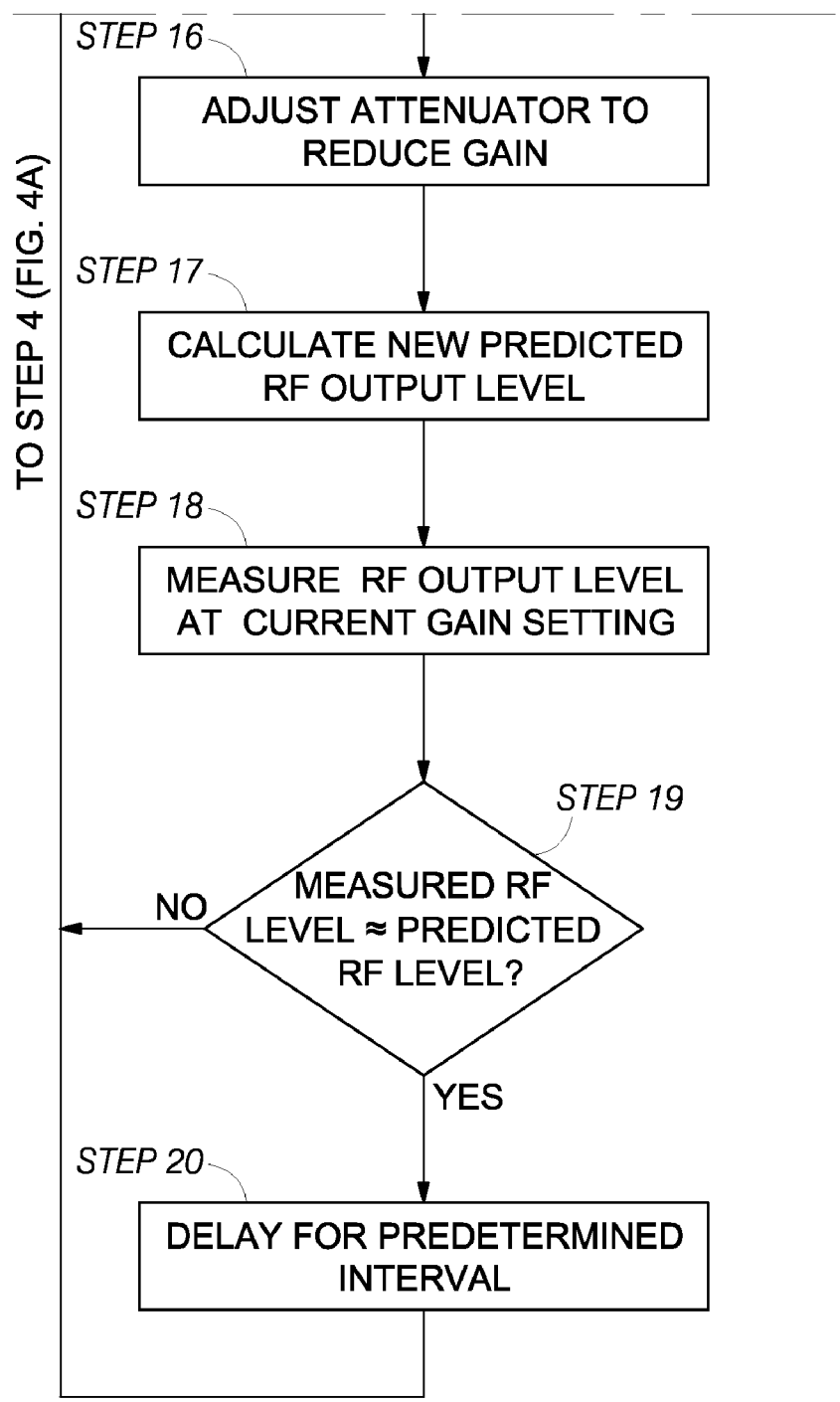

To overcome the limitations of radiated signal isolation and allow higher than typical stable gain to be achieved, the radiated RF signal booster 110 of FIG. 2 includes the unique gain stabilization network 118, which is shown in more detail in FIG. 3. The method that incorporates the gain stabilization network 118 (described in more detail below in connection with FIG. 4) samples the output signal of an amplifier and properly adjusts the phase and amplitude of the sampled signal to produce an adjusted signal. When the adjusted signal is recombined with the composite amplifier input signal (comprising the radiated coupled signal and an incoming signal from an external source), the amplitude of the received radiated parasitic signal at the amplifier input is reduced. Other non-coherent signals that are received at the amplifier input are not affected. The combination of the gain stabilization network 118 and the method reduce the loop back gain so that the overall system gain can be increased.

As illustrated in FIG. 3, the stabilization network 118 comprises an RF sample coupler 150, an RF vector modulator 152, a matching RF band pass filter 154, an RF combiner (recombining coupler) 156 and an adjustable RF attenuator 158. An RF detector 160 is coupled to the output of the RF amplifier 114 via a coupler 162. The RF detector 160 produces a detector output signal proportional to the output of the RF amplifier 114. The detector output signal is provided as an input signal to an analog (ADC) input 166 of a microprocessor 164, which monitors system performance, as described below.

The vector modulator 152 provides gain and phase adjustment of the stabilization signal so that maximal reduction of the radiated parasitic signal can be achieved at the point of recombination. The vector modulator 152 is controlled by two input signals from the microcontroller 164, which are designated as an "I" (in-phase) signal on a control line 170 and a "Q" (quadrature) signal on a control line 172.

The adjusted signal produced by the vector modulator 152 is provided as an input to the band pass filter 154. The band pass filter 154 filters the signal to limit the bandwidth of the stabilization network 118 so that out-of-band isolation is not adversely affected. The band pass filter 154 also reduces group delay mismatch between the radiated RF signal path and the stabilization signal path. The reduction in group delay mismatch maximizes the useful bandwidth of the stabilization network 118. The band pass filter 154 produces a bandwidth-limited output signal. Band pass filtering of the sampled signal path as well as band pass filtering of the RF signal path maintains overall amplifier loop stability to control out-of-band loop gain of both paths. Although shown as a single band pass filter 154, the band pass filter 154 preferably comprises a set of band pass filters. Preferably, the RF signal path includes a set of matched band pass filters to allow for matched group delay between the stabilization signal path and the RF signal path to obtain broadband performance.

Figure 11:
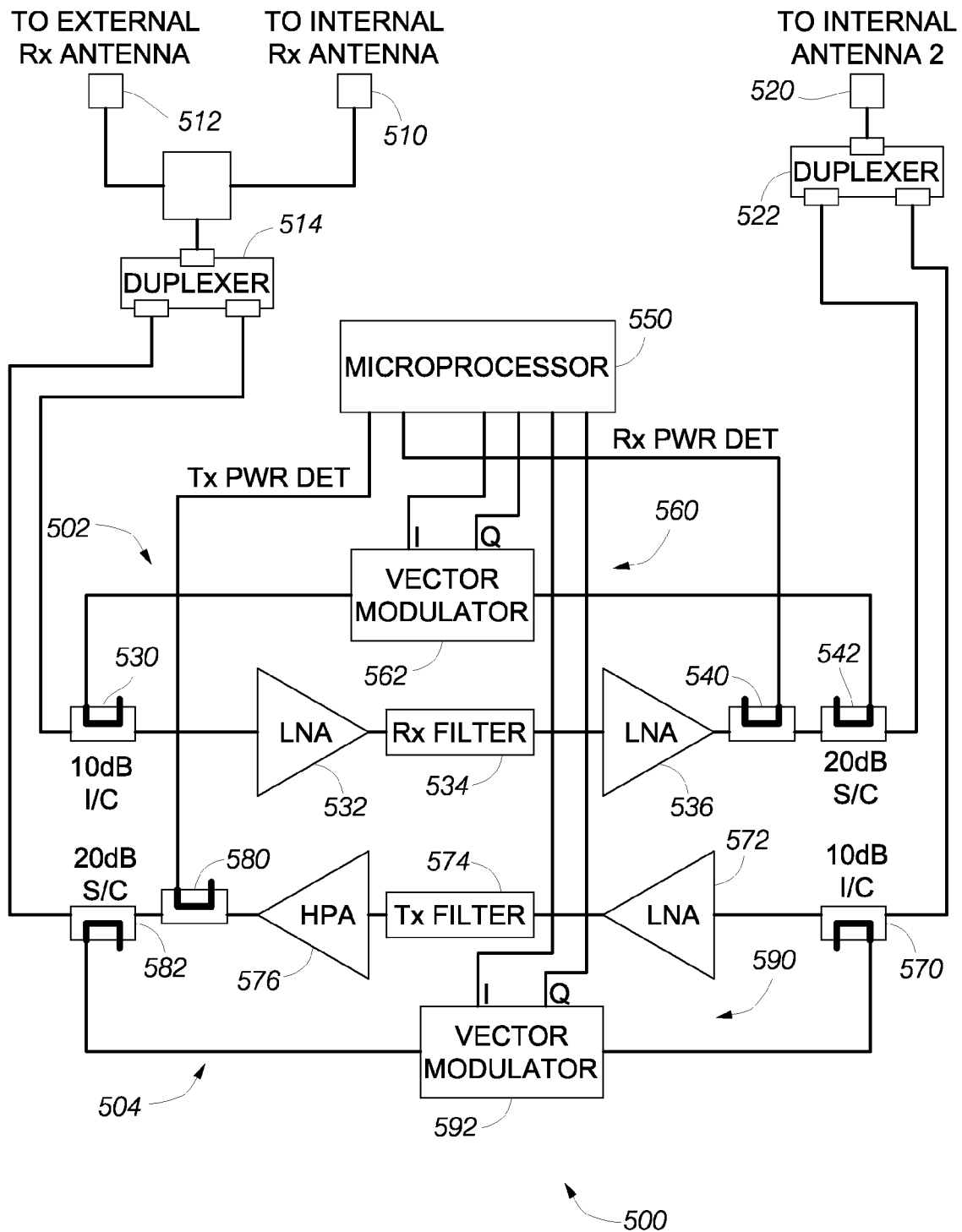
FIG. 11 illustrates a complete signal booster system having a feedback path for signals propagating in two directions with both feedback paths being controlled by a single microcontroller.

The RF recombining coupler 156 has two inputs and an output. One input (+) of the RF recombining coupler 156 receives the RF input signal from the Rx antenna 112. The other input (−) receives the bandwidth-limited output signal from the band pass filter 154. The output of the RF recombining coupler 156 is provided as an input to the RF attenuator 158. The output of the RF attenuator 158 is provided as the input of the RF amplifier 114, which is preferably a low noise RF amplifier that minimizes adverse effects on the noise figure. Preferably, the RF signal is subsequently band pass filtered and amplified (as shown in FIG. 11) to maximize the gain while maintaining overall gain stability.

The RF input signal from the Rx antenna 112 includes an input signal to be amplified (represented by an arrow 180). The RF input signal also includes a radiated coupled signal (represented by an arrow 182) from the Tx antenna 116. The bandwidth-limited output signal from the band pass filter 154 functions as a stabilization signal, which is combined with the RF input signal to at least partially compensate for the radiated coupled signal 182. Accordingly, the combination of the stabilization signal and the radiated coupled signal 182 is provided at the input of the RF amplifier 114 along with the input signal to be amplified 180. As discussed below, the RF vector modulator 152 is actively adjusted to provide real-time adjustments of the stabilization network 118.

The active adjustment of the amplitude and phase of the stabilization network 118 enables the system to achieve maximum stable system gain. The active adjustment provides real time correction for changing system conditions, such as changes in radiated signal strength, changes in multi-path environmental conditions, and variations in amplifier transfer characteristics. The active adjustment of the stabilization network maintains optimal system performance. The method for adjusting the stabilization network 118 enables the system to operate at maximum stable gain in the presence of time varying conditions.

As stated above, the RF detector 160 detects the output power of the RF amplifier 114 via the coupler 162 and provides the detected power signal to the microcontroller 164 to enable the microcontroller to monitor the output power level of the RF amplifier 114. Monitoring of the output power level allows the active stabilization network 118 to detect changing system conditions that affect the output power level of the RF amplifier 114 and to adjust parameters of the stabilization network 118 in response to changing system conditions. For example, if the detected output power level of the RF amplifier 114 exceeds a predetermined threshold, the microcontroller 164 assumes that an unstable condition is present. The microcontroller 164 responds to the unstable condition by varying the values of the "I" and "Q" input signals to the vector modulator 152 while continuing to monitor the output power level of the RF amplifier 114. If stable gain cannot be achieved by a combination of values for the "I" and "Q" signals, the microcontroller 164 adjusts the RF gain of the gain path of the amplifier 114 by adjusting the attenuation of the adjustable RF attenuator 158. For example, the RF gain is decreased until stability is reestablished. After stability is achieved, the RF gain is increased incrementally by adjusting the RF attenuator 158, and the values of the "I" and "Q" signals are readjusted until maximum stable gain for the current conditions is achieved.

The active stabilization network 118 is controlled by an algorithm implemented in the microcontroller 164. The algorithm monitors system performance and provides continual adjustments to the active stabilization network. The algorithm allows the system to continually optimize performance. In a preferred embodiment illustrated by the flow chart in FIG. 4 (comprising FIGS. 4A, 4B and 4C), the algorithm performs the following steps starting with Step 1 in FIG. 4A.

Step 1: Set the stabilization control input signals (e.g., the "I" input signal on the line 170 and the Q input signal on the line 172) to predetermined starting values (e.g., set "I"=$I_0$, and set "Q"=$Q_0$), and apply the two stabilization control input signals to the control inputs of the vector modulator 152.

Step 2: Set the gain of the RF path to a predetermined starting level by adjusting the RF attenuator 158.

Step 3: Measure the initial RF output level via the RF detector 160 and save the initial RF output level as a reference level.

Step 4: Incrementally increase the gain of the RF path by reducing the attenuation provided by the RF attenuator 158 by a predetermined incremental amount; and calculate the expected value of the RF output level from the RF detector 160 based on the current attenuation adjustment.

Step 5: Measure the current RF output level via the RF detector 160.

Step 6: Compare the measured RF output level with the predicted RF output level; and if the two levels are approximately the same, return to Step 4 to again reduce the attenuation in order to increase the gain; otherwise, proceed to Step 7.

Step 7: Compare the current measured RF output level with the previously measured RF output level. If the current RF output level has increased by more than a predetermined amount ($\Delta RF$) go to Step 9 (FIG. 4B); otherwise proceed to Step 8.

Step 8: If the current measured RF output level exceeds a predetermined threshold ($RF_{TH}$), proceed to Step 9 (FIG. 4B); otherwise, return to Step 4 to further increase the gain.

Step 9: Incrementally adjust the value of the "I" input signal on the line 170 and apply each value to the vector modulator 152. The values are adjusted with alternating positive and negative increments (e.g., new "I"=current "I"+a, where a=+1, −2, +3, −4, etc.) until the magnitude of "I" reaches a maximum value $I_X$. For example, starting with the initial value $I_0$, apply the values $I_0$, $I_0+1$, $I_0-1$; , $I_0+2$, $I_0-2$, etc., to the vector modulator 152.

Step 10: Measure the current RF output level for each value of the "I" input signal applied to the vector modulator 152.

Step 11: If the measured RF output level returns to the expected predetermined level for a particular value of the "I" input signal 14, return to Step 4 (FIG. 4A); otherwise, proceed to Step 12.

Step 12: Compare the current value of the "I" input signal on the line 170 with the maximum value $I_X$. If the current value of the "I" input signal is less than $I_X$, return to Step 9; otherwise, proceed to Step 13.

Step 13: Reset the value of the "I" input signal to the initial value $I_0$.

Step 14: Incrementally adjust the value of the "Q" input signal on the line 172 (e.g., new "Q"=current "Q"+b, where b=+1, −2, +3, −4, etc.) until the magnitude of "Q" reaches a maximum value $Q_Y$. For example, starting with the initial value $Q_0$, apply the values $Q_0$, $Q_0+1$, $Q_0-1$, $Q_0+2$, $Q_0-2$, etc., in sequence.

Step 15: After each incremental adjustment of the value of the "Q" input signal, compare the adjusted value of Q to the maximum value $Q_Y$. As long as the adjusted value of Q is less than the maximum value $Q_Y$, return to Step 10 to measure the RF output level for the new value of "Q" with "I" set to the initial value of $I_0$. If the adjusted value of Q is equal to the maximum value $Q_Y$, proceed to Step 16.

Step 16: The algorithm reaches Step 16 if no combination of values for the I input signal on the line 170 and the Q input signal on the line 172 causes the system performance to improve with the current setting of the attenuator 158. Accordingly, the attenuator 158 is adjusted to reduce the gain by an incremental amount.

Step 17: Calculate a new predicted RF output level and then proceed to the following Step 18.

Step 18: Measure the RF output level at the new attenuator setting and then proceed to the following Step 19.

Step 19: If the RF output level measured in Step 16 is approximately equal to the expected RF output level for the reduced gain, the algorithm proceeds to Step 18; otherwise, if the measured RF output level does not change as expected, the algorithm returns to Step 4 immediately.

Step 20: Wait (delay) for a predetermined interval (e.g., 30 seconds) and then return to Step 4 to repeat the foregoing steps of the algorithm.

Figure 5:
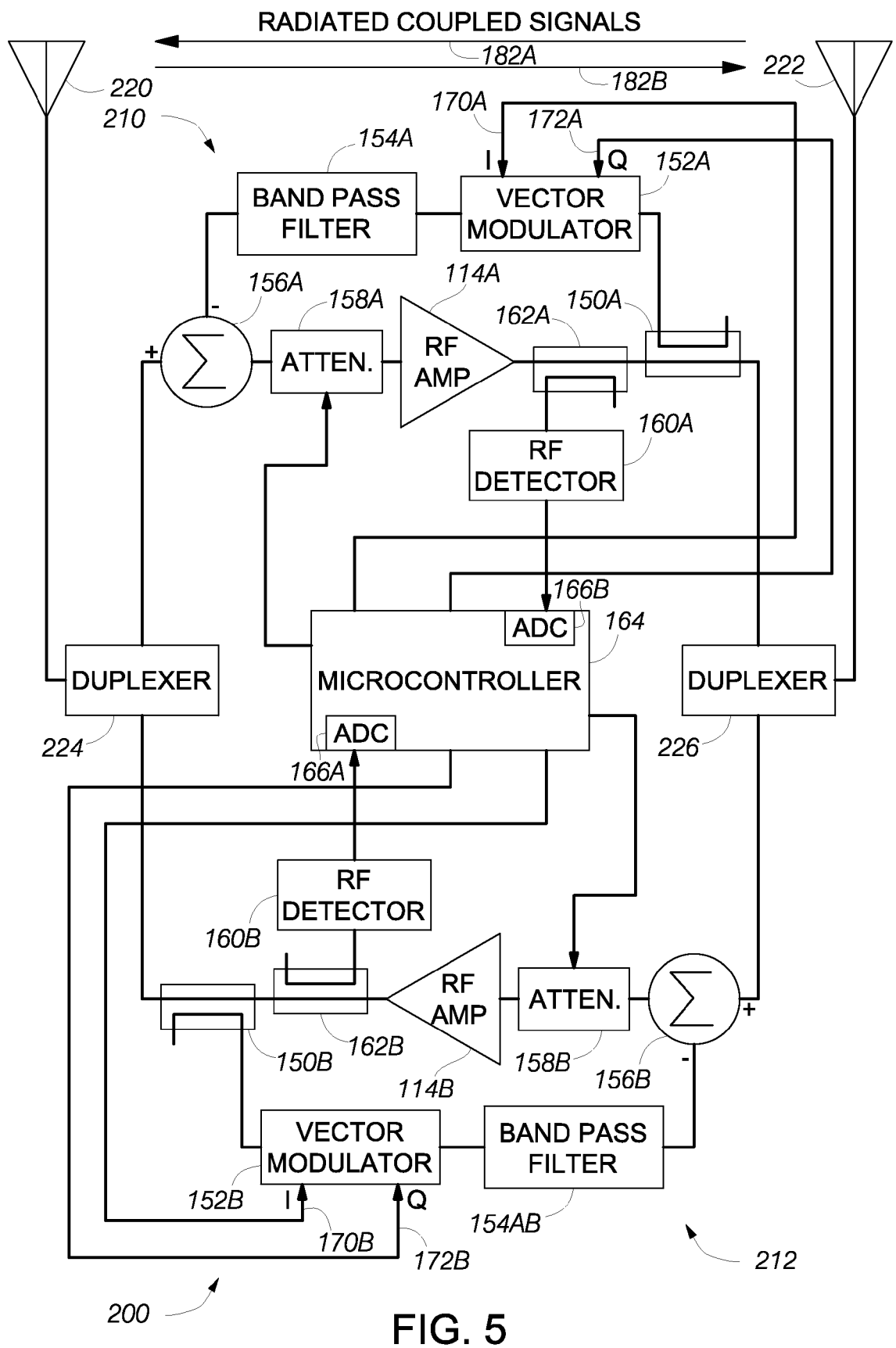
FIG. 5 illustrates a full duplex RF signal booster incorporating the active stability control of FIG. 3.

FIG. 5 illustrates a full duplex RF signal booster 200 incorporating the active stability control of FIG. 3 comprising a first signal booster path 210 and a second signal booster path 212 between a first input/output antenna 220 and a second input/output antenna 222. Using the identification convention introduced in FIG. 3, the first input/output antenna 220 is referred to as the Rx antenna 220, and the second input/output antenna 222 is referred to as the Tx antenna 222.

The first signal booster path 210 receives remote signals from the Rx antenna 220 via a first RF duplexer 224 and outputs boosted signals to the Tx antenna 222 via a second RF duplexer 226. The first signal booster path 210 operates at a frequency used by a cellular telephone system to transmit signals from a cellular tower (also referred to herein as a base station) to a cellular telephone. Accordingly, the first signal path 210 is referred to herein as the receive (Rx) band path.

The second signal booster path 212 receives local signals from the Tx antenna 222 via the second RF duplexer 226 and outputs boosted signals to the first input/output antenna 220 via the first RF duplexer 224 to transmit the signals to the cellular tower at second frequency. Accordingly, the second signal booster path 212 is referred to herein as the transmit (Tx) band path.

Each signal booster path in FIG. 5 operates in similar manner to the signal booster path described above in connection with FIG. 3 and includes like components, which are numbered accordingly except that the suffix "A" is added to the element numbers for the components and signals in the first signal (Rx) booster path 210 and the suffix "B" is added to the element numbers for the components and signals in the second signal (Tx) booster path 212. The common microcontroller 164 in FIG. 5 controls the two signal paths independently with two algorithms corresponding to the algorithm illustrated in FIG. 4. The parameters of the two algorithms are adjusted independently in response to system conditions that may have a different effect on each signal path, which operate at different frequencies. Alternatively, each booster path may have a respective microcontroller.

Figure 6:
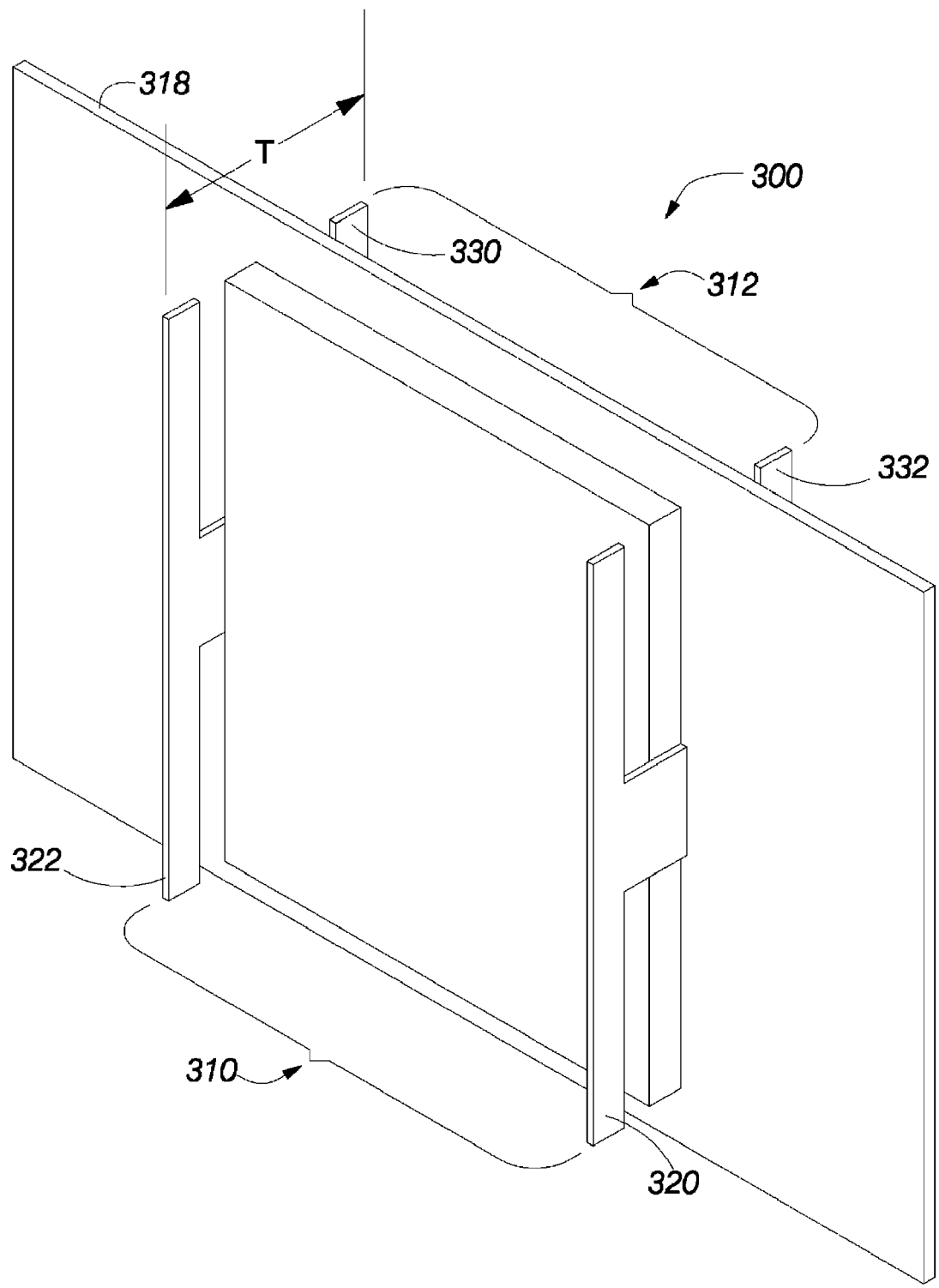
FIG. 6 illustrates an embodiment of signal booster having two co-located antennas that are spaced apart by approximately 1.5 inches, and further illustrates a receive (Rx) antenna, which is configured for a specified frequency with two elements physically separated by ½ wavelength ($\lambda/2$) and with the two elements electrically driven in phase (e.g., 0 degrees or 0 radians phase difference)
Figure 8:
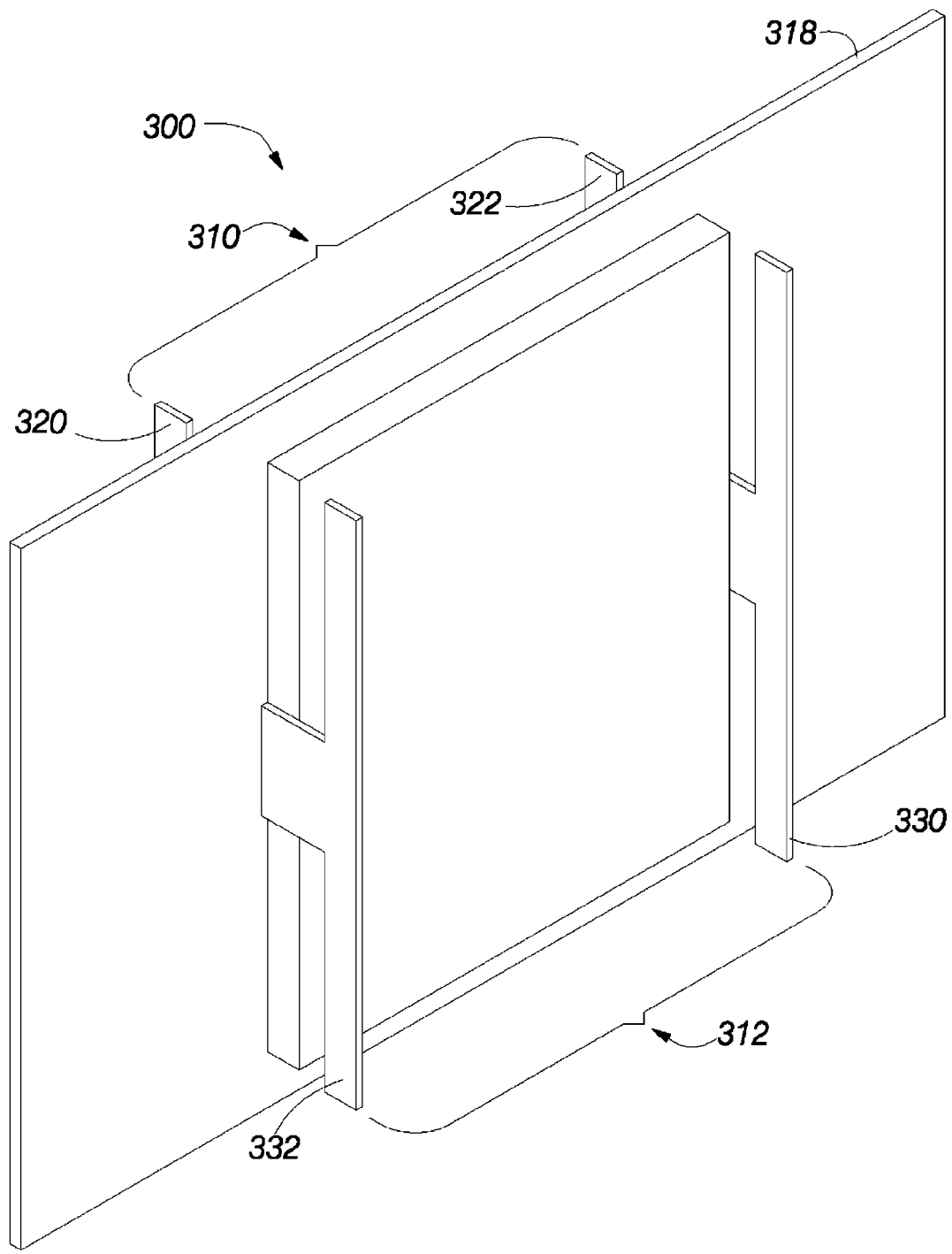
FIG. 8 illustrates a transmit (Tx) antenna for the system illustrated in FIG. 4, which has two elements physically separated by ½ wavelength ($\lambda/2$) and which has the two elements electrically driven out of phase by 180 degrees ($\pi$ radians) at the specified frequency.

FIGS. 6-11 illustrate an embodiment of a multi-band repeater 300, which incorporates the system of FIG. 5 in a fixed location (e.g., a residence or a business) with the repeater using collocated antennas. As illustrated in FIG. 6, the multi-band repeater 300 is packaged with a receive (Rx)

antenna pair 310 (corresponding to the Rx antenna 220 in FIG. 5) and a transmit (Tx) antenna pair 312 (corresponding to the Tx antenna 222 in FIG. 5). The antenna element for the Rx antenna 310 is shown in FIG. 6. The antenna element for the Tx antenna 312 is shown in FIG. 8. Preferably, the two paired sets of antennas are co-located on opposite sides of the packaging (e.g., an enclosure (not shown)) that houses the system. For example, in the illustrated embodiment, an RF circuit board 318 supports the Rx antenna pair 310 on one side (FIG. 6) and supports the Tx antenna 312 on an opposite side (FIG. 8). The two sets of paired antennas are spaced apart by a spacing (T), which is approximately 1.5 inches in the illustrated embodiment. The RF circuit board 318, which supports and interconnects the components shown in FIG. 5, is interposed between the Rx antenna pair 310 and the Tx antenna pair 312 within the enclosure (not shown).

With two closely positioned antennas and a high gain amplifier, the system would likely be unstable and would likely oscillate, which would create unwanted spurious signal in the band of operation. The requirements for stability of the Rx band amplifier and the Tx band amplifier for a repeater are met by the implementation of shielding and by the active cancellation techniques described above. The implementation of these techniques enables a stable gain of more than 60 dB to be provided between the co-located indoor antenna (Tx antenna pair) 310 that is used to communicate with a local cell phone and the outdoor antenna (Rx antenna pair) 312 that is used to communicate with a base station. The multi-band repeater 300 uses phased antennas described in the following paragraphs and active stability control described above.

Figure 7:
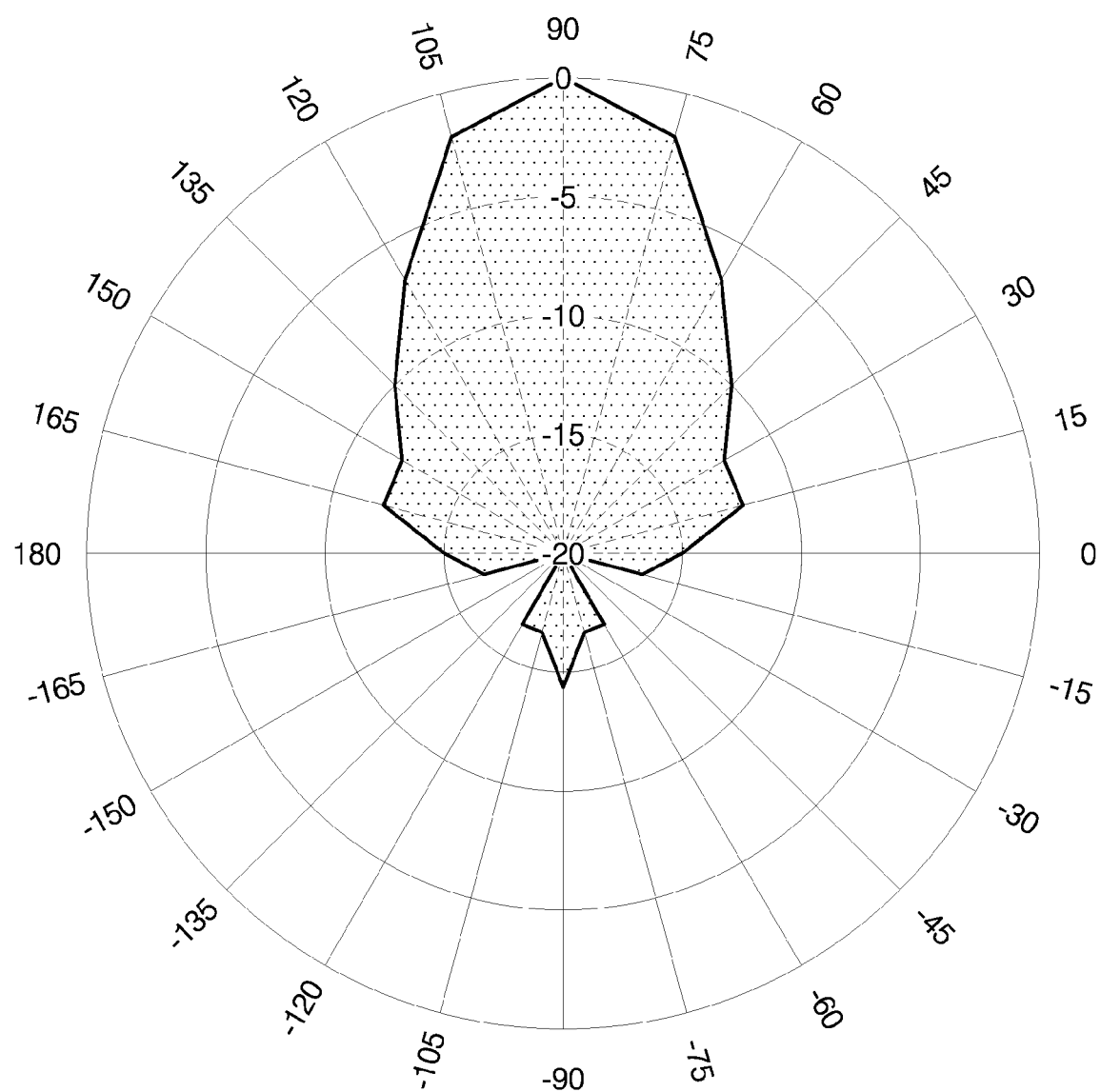
FIG. 7 illustrates the radiation pattern of Rx antenna illustrated in FIG. 6.

The Rx antenna pair 310 illustrated in FIG. 6 is directed at the base station. The Rx antenna 310 comprises 2 antenna elements 320 and 322 that are physically separated by ½ wavelength ($\lambda/2$) and that are electrically driven in phase. The signal from the RF board that drives the two elements is divided using a 0-degree splitter (not shown). The active elements of the Rx antenna 310 are positioned at a controlled distance above a ground plane, which is formed as part of the RF circuit board 318, to reflect RF power in the required direction. The positioning of the active elements increases the forward directivity of the antenna, thereby reducing the back radiation. FIG. 7 illustrates an exemplary radiation pattern of the Rx antenna 310.

Figure 9:
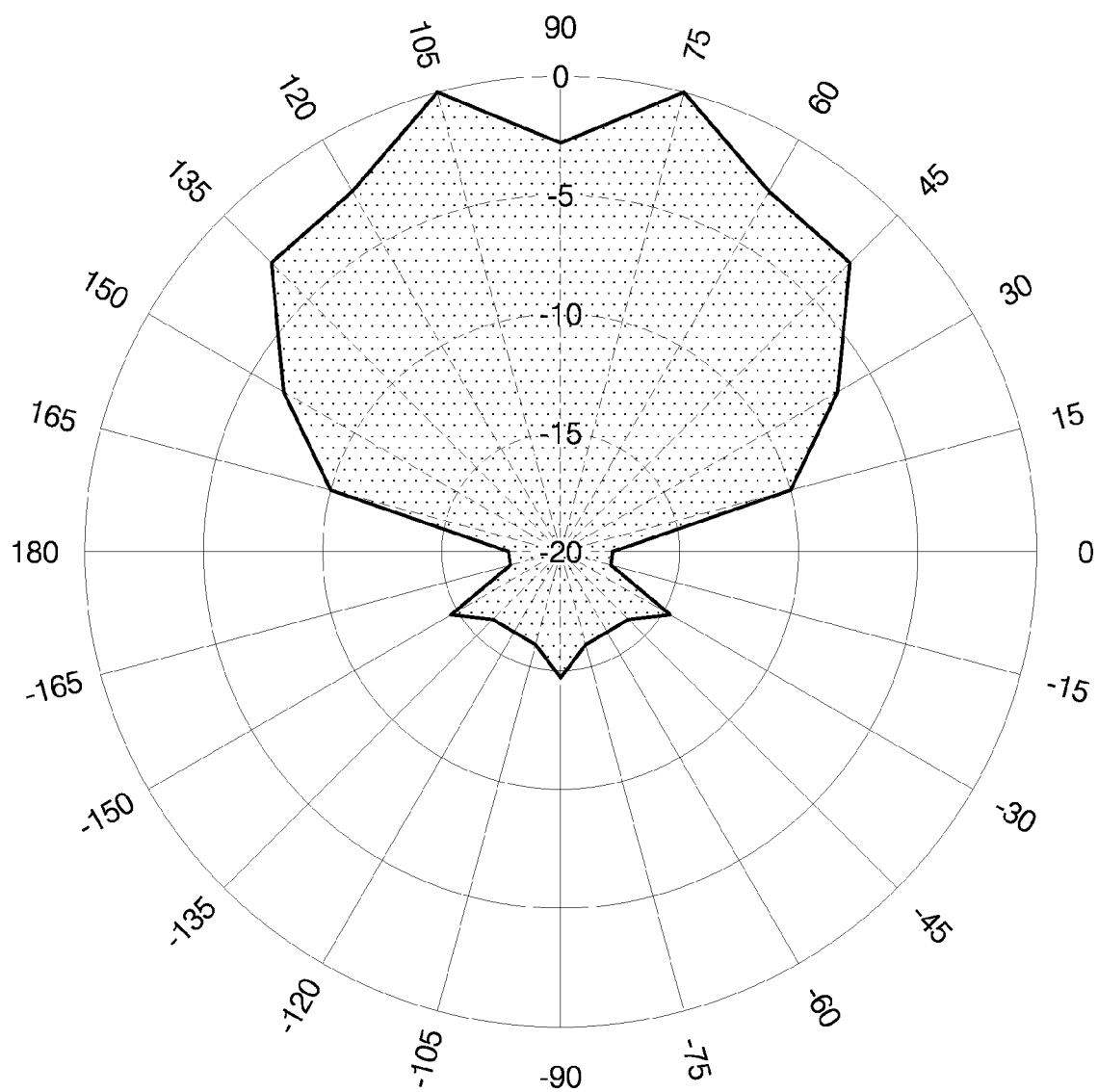
FIG. 9 illustrates the radiation pattern of the Tx antenna illustrated in FIG. 8.
Figure 10:
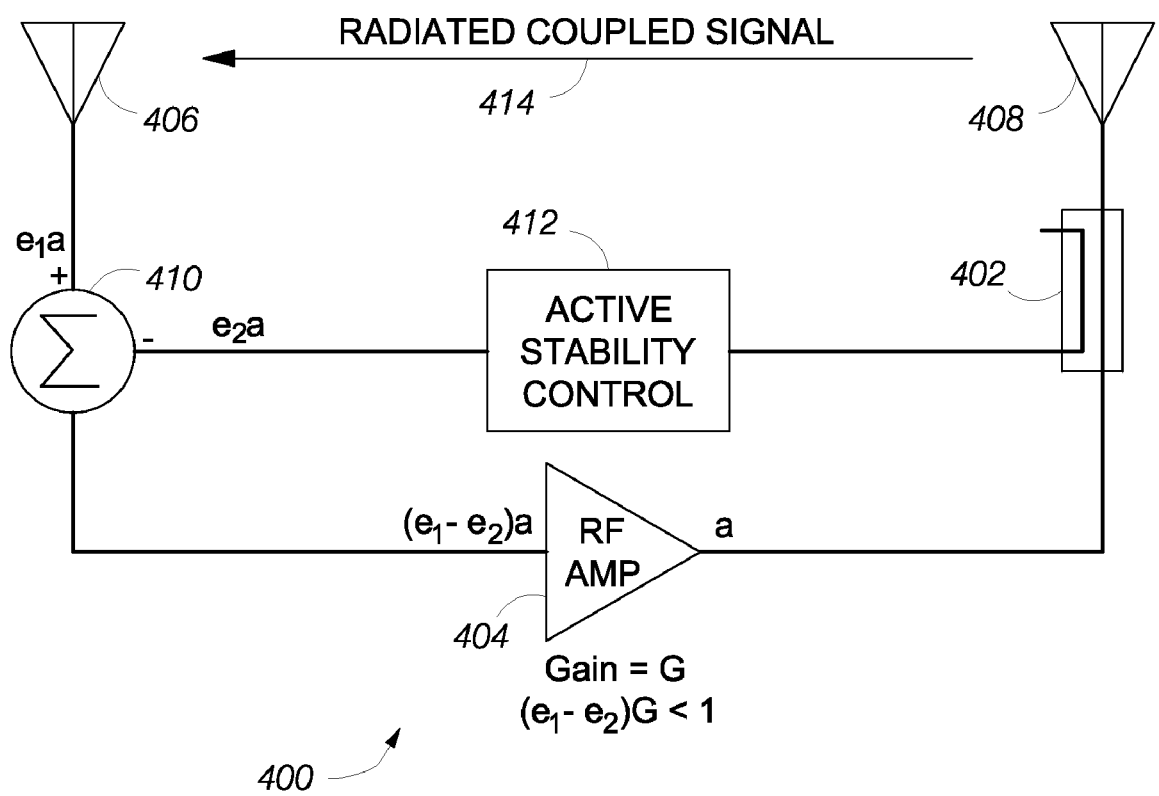
FIG. 10 illustrates a mathematical representation of the Rx path of the signal booster of FIGS. 6-9 with active stability control set with parameters to assure that the gain is stable.

FIG. 8 illustrates an exemplary embodiment of the Tx antenna pair 312, which is directed internally to the user. The Tx antenna pair 312 comprises 2 antenna elements 330 and 332 that are physically separated by ½ wavelength ($\lambda/2$) and that are electrically driven out of phase. The signal driving the two elements is divided using a 180-degree balun (not shown). The structure and phasing of the Tx antenna pair 312 produces 2 lobes, which have canceling effects on signal reflected towards the center of the elements and its outer fringes. The phasing techniques advantageously allow the system to achieve approx 45 dB of isolation. FIG. 9 illustrates an exemplary radiation pattern of the Tx antenna pair 312.

The system utilizes stability control (described above) to attain better than 60 dB of stable gain. As illustrated by a mathematical representation 400 of the system in FIG. 10, active stability control is provided by sampling (function 402) a signal (a) at the output of the amplifier 404 in the Rx path between an Rx antenna 406 and a Tx antenna 408. A signal ($e_2 a$) responsive to the sampled signal is injected (via a combining function 410) into the input ($e_1 a$) of the Rx path. The active stability control 412 causes the injected signal ($e_2 a$) to be 180 degrees out of phase and equal in amplitude to the radiated coupled signal 414 that is coupled from Tx antenna 408 to the Rx antenna 406. The amplitude is estimated to be −45 dBc. The difference ($e_1 - e_2$)a is applied as the input to the amplifier path represented by the amplifier 404. The delay of the active path is set to closely match the near field leakage path. If an oscillation occurs, the loop detects the change in RF power and adapts automatically to suppress the unwanted signal. The phase and amplitude are actively controlled by a vector modulator (described above), which is in turn controlled by a microcontroller (described above). The gain (G) of the amplifier 404 is adjusted by the active stability control 412 to a value to assure that ($e_1 - e_2$)G<1. The same active cancellation technique is employed on the Tx side of the repeater (e.g., the path from the Tx antenna 408 to the Rx antenna 406).

FIG. 11 illustrates a block diagram with another representation of a duplex RF signal booster 500, which has a receive (Rx) path 502 and a transmit (Tx) path 504. The Rx path 502 receives a distant signal via an internal Rx antenna connection 510 or an external Rx antenna connection 512 and a first duplexer 514. The Rx path 502 outputs a boosted local signal to an internal Tx antenna connection 520 via second duplexer 522. The Tx path 504 receives a locally transmitted signal via the internal Tx antenna connection 520 and the second duplexer 522. The Tx path 504 outputs a boosted distant signal via the first duplexer 514 and either the internal Rx antenna connection 510 or the external Rx antenna connection 512.

In the Rx path 502, the received distant signal from the first duplexer 514 passes through a 10 db injection coupler (10 db I/C) 530, and is amplified by a first Rx path low noise amplifier (LNA) 532. The output of the first Rx path amplifier 532 is filtered by an Rx filter 534. The output of the Rx filter 534 is amplified by a second Rx path low noise amplifier 536 to produce the output signal to be retransmitted as the local signal. The Rx path 502 advantageously includes selective attenuation (see FIG. 5) as part of the second Rx path low noise amplifier to further adjust the gain while maintaining overall gain stability. The output of the second Rx path amplifier 536 passes through an RF power detector 540 and through a 20 db sample coupler (20 dB S/C) 542 to the second duplexer 522 and then to the internal Tx antenna connection 520 to be transmitted locally as a boosted Rx signal.

The RF power detector 540 measures the RF output level from the second Rx path amplifier 536 and provides a value to a microprocessor 550 that is responsive to the RF output level. The 20 dB sample coupler 542 provides a sampled output signal responsive to the amplitude and phase of the output of the second Rx path amplifier 536. The sampled output signal from the 20 dB sample coupler 542 is provided as the input to a Rx feedback path 560, which includes a vector modulator 562 and which may include other components (e.g. a variable attenuator (not shown)). The vector modulator 562 is controlled by the microprocessor 550 in response to the detected RF output level in a similar manner to the vector modulator 152 in FIG. 3 (e.g., in accordance with the algorithm illustrated in FIG. 4). The output of the vector modulator 562 is combined with the Rx input signal in the 10 dB injection coupler 530 to reduce the effect of radiated coupled RF signals, as discussed above.

In the Tx path 504, the received local signal from the second duplexer 522 passes through a 10 db injection coupler (10 db I/C) 570, and is amplified by a first Tx path low noise amplifier (LNA) 572. The output of the first Tx path amplifier 572 is filtered by a Tx filter 574. The output of the Tx filter 574 is amplified by a second Tx path amplifier 576 to produce the output signal to be retransmitted as the distant signal to the remote base station (e.g., a cell system tower). The second Tx path amplifier 576 is advantageously a high power amplifier (HPA) in order to provide the power needed to transmit to the remote base station. The output of the second Rx path amplifier 576 passes through an RF power detector 580 and through a 20 db sample coupler (20 dB S/C) 582 to the first duplexer 514 and then to the internal Rx antenna connection 510 or the external Rx antenna connection 512 to be transmitted to the distant base station as a boosted Tx signal.

The RF power detector 580 measures the RF output level from the second Tx path amplifier 576 and provides a value to the microprocessor 550 that is responsive to the RF output level. The 20 dB sample coupler 582 provides a sampled output signal responsive to the amplitude and phase of the output of the second Tx path amplifier 576. The sampled output signal from the 20 dB sample coupler 582 is provided as the input to a Tx feedback path 590, which includes a vector modulator 592 and which may include other components (e.g. a variable attenuator (not shown)). The vector modulator 592 is also controlled by the microprocessor 550 in response to the detected RF output level in a similar manner to the vector modulator 152 in FIG. 3 (e.g., in accordance with the algorithm illustrated in FIG. 4). The output of the vector modulator 592 is combined with the Tx input signal in the 10 dB injection coupler 570 to reduce the effect of radiated coupled RF signals, as discussed above.

Figure 12:
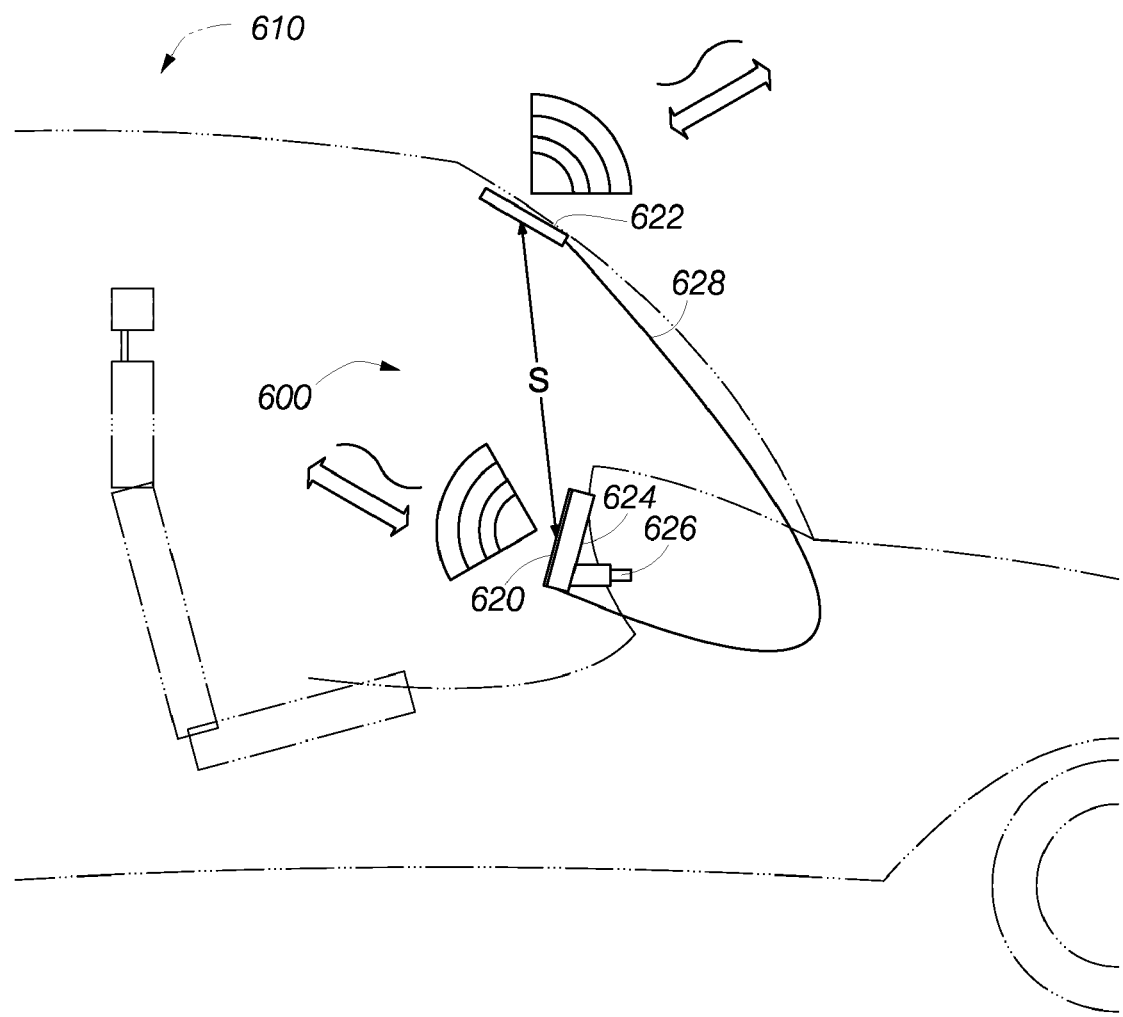
FIG. 12 illustrates a signal booster (multi-band repeater) installed in a vehicle with both antennas within the cabin or proximate to the cabin of the vehicle with the Rx antenna interconnected with the signal booster with a cable.

FIG. 12 illustrates an embodiment of an RF repeater system 600 in accordance with the systems and methods described above. The RF repeater system 600 is incorporated into a vehicle 610 (shown in part in phantom) to provide a mobile repeater application. The multi-band repeater system 600 includes a transmit (Tx) antenna 620, which is directed internally towards the cell phone of the user (e.g., the driver or a passenger in the vehicle 610), and a receive (Rx) antenna 622, which receives signals from and transmits signals to the cellular base station (e.g., a cellular tower). As shown in FIG. 12, the multi-band repeater is advantageously installed with both the Tx antenna 620 and the Rx antenna 622 within the cabin of the vehicle 610. The two antennas are separated by a distance S, which may be in a range of less than one foot to more than 3 feet. The Tx antenna 620 is advantageously mounted on an enclosure 624, which houses an RF circuit board (not shown). The RF repeater system 600 advantageously receives power via a conventional accessory plug 626, which is inserted into a conventional accessory socket (not shown) in the cabin of the vehicle. The Rx antenna 622, which may be mounted to the inside of the windshield as shown, is coupled to the external Rx antenna connection (discussed above) via a micro-coaxial cable 628, which is advantageously routed around the inside perimeter of the windshield of the vehicle. Alternatively, one or both antennas can be installed on the outside of the vehicle 610 proximate to the cabin.

As discussed above, with two closely positioned antennas and a high gain amplifier, the system would likely oscillate and create unwanted spurious signal in the band of operation. In order to provide stability for the Rx band amplifier and the Tx band amplifier for a repeater, the system illustrated in FIG. 12 implements shielding along with the antenna phasing and active cancellation techniques described above. The implementation of these techniques provides stable gain of more than 60 dB between the closely located antennas in the front panel and in or on the window. By employing these phasing techniques, it is possible to achieve approximately 45 dB of isolation.

Unlike the previously described stationary embodiment, both the Rx antenna 620 and the Tx antenna 622 have antennas of similar construction and operation. In particular, both antennas advantageously have a structure and operation corresponding to the Tx antenna 312 of FIG. 8 (e.g., each antenna has 2 elements that are physically separated by ½ wavelength and that are electrically in phase). The respective signal driving the two elements of each antenna is divided using an in-phase (0 degree) splitter. The Tx antenna 620 and the Rx antenna 622 each produces 2 lobes, which have canceling effects on a signal reflected towards the center of the elements and its outer fringes. For example, FIG. 9 (discussed above) illustrates an exemplary radiation pattern for both antennas. The broad radiation pattern allows for a less directional coverage, which is typical of a dipole antenna.

Figure 13:
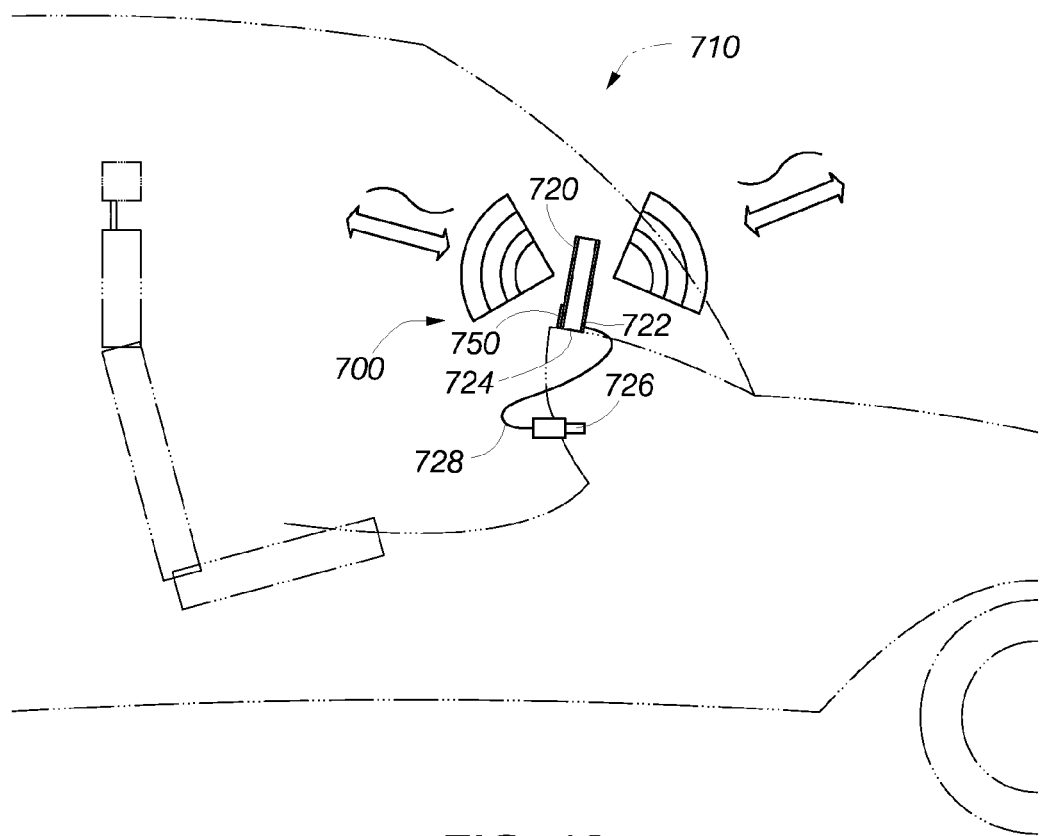
FIG. 13 illustrates a signal booster (multi-band repeater) installed in a vehicle with both antennas co-located on a common enclosure and further including a Bluetooth interface.

FIG. 13 illustrates an embodiment of an RF repeater system 700 in accordance with the systems and methods described above. The RF repeater system 700 is incorporated into a vehicle 710 (shown in part in phantom) to provide a mobile repeater application. The multi-band repeater system 700 includes a transmit (Tx) antenna 720, which is directed internally towards the cell phone of the user (e.g., the driver or a passenger in the vehicle 710), and a receive (Rx) antenna 722, which receives signals from and transmits signals to the cellular base station (e.g., a cellular tower). Unlike the embodiment shown in FIG. 12, the multi-band repeater 700 of FIG. 13 is packaged with the Tx antenna 720 and the Rx antenna 722 co-located on opposite sides of a common enclosure 724 within the cabin of the vehicle 710. For example, the two antennas are advantageously spaced approximately 1.5 inches apart as described above in connection with FIG. 6. The enclosure 724 houses an RF circuit board, such as, for example, the circuit board shown in FIG. 6. The RF repeater system 700 advantageously receives power via a conventional accessory plug 726, which is inserted into a conventional accessory socket (not shown) in the cabin of the vehicle, and which provides power via a power cord 728. The enclosure 724 with the two antennas may be mounted to the inside of the windshield or may be mounted on the dashboard of the vehicle as shown in FIG. 12.

Figure 14:
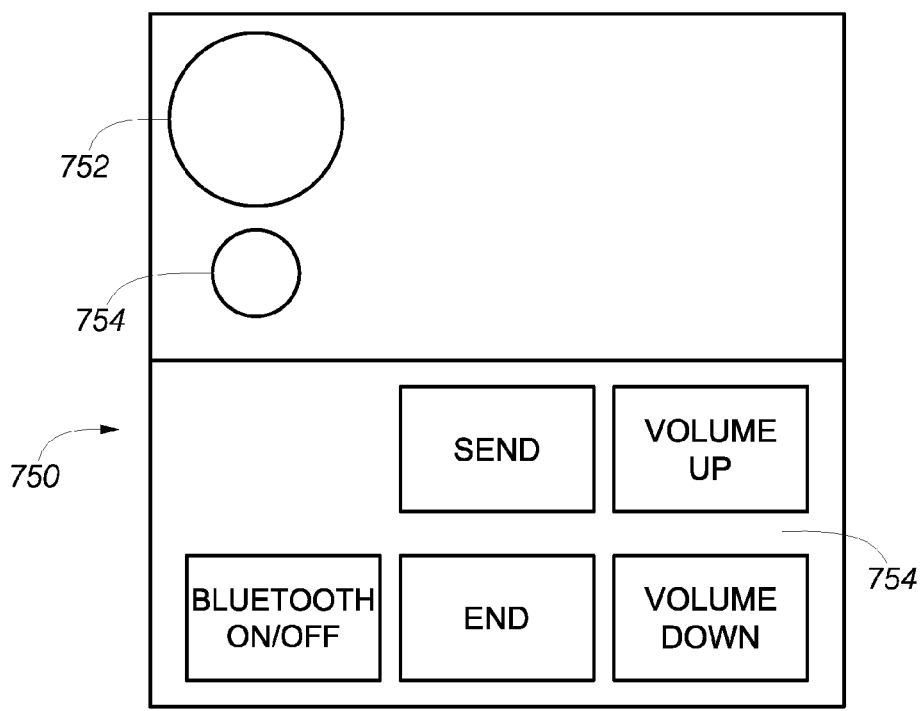
FIG. 14 illustrates an embodiment of the Bluetooth interface of the signal booster of FIG. 13.

To enhance the ease of use of the cell phone within the automobile, the signal booster is equipped with a Bluetooth interface 750 comprising a transceiver (not shown), a speaker 752, a microphone 754 and a touch screen 756 (shown in FIG. 14). The Bluetooth interface 750 enables hands free operation of the cell phone of a user in the cabin of the vehicle 710. The cell phone of the driver or passenger synchronizes with the signal booster's Bluetooth transceiver (not shown) in a similar manner to that of standard off the self Bluetooth ear sets. Once the Bluetooth interfaces of the cell phone and the signal booster are synchronized, the cell phone can be answered and controlled via the menu-driven touch screen interface 756, shown in more detail in FIG. 14.

The system and method described herein can be used for any application to provide real-time amplification and radiated re-transmission of a received radiated signal without the use of frequency conversion. The system and method can be used in simplex systems (e.g., systems that provide time separated two-way communications) and in duplex systems (e.g., systems that provide simultaneous two-way communications). The system and method can be used for any application where the transmit antenna and the receive antenna are collocated. Such an application is described above in connection with FIGS. 6-11. The system and method can be used for any application where the transmit antenna and the receive antenna are not collocated. The system and method can be used for fixed applications as illustrated in FIGS. 6-11 and can be used in mobile applications (e.g., land, sea, and air) as illustrated in FIGS. 12-14. The system and method can be used in applications above the surface, on the surface and below the surface. the system and method can be used with systems having any number of separate communication links, which can be separated by time or separated by frequency. The described invention will work with any Radiated RF Signal booster independent of frequency. The described invention will also work with WiMax routers, RFID devices, and other applications that need to collocated antennas.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A cellular telephone signal booster system comprising:
    a first antenna that receives remote incoming cellular signals at a first frequency from a remote cellular site and that transmits remote outgoing cellular signals to the remote cellular site at a second frequency;
    a second antenna that transmits local outgoing cellular signals responsive to the remote incoming cellular signals to a local cellular telephone at the first frequency and that receives local incoming cellular signals from the local cellular telephone at the second frequency;
    a first RF amplifier that is responsive to the remote incoming cellular signals from the first antenna at the first frequency to provide the local outgoing cellular signals at the first frequency to the second antenna;
    a second RF amplifier that is responsive to the local incoming cellular signals from the second antenna at the second frequency to provide the remote outgoing cellular signals at the second frequency to the first antenna;
    a first active stability network operating at the first frequency that decreases the amount of radiated or conducted parasitic cellular signal between the first and the second antenna by combining a first stabilization signal that at least partially compensates for the parasitic cellular signal with a first RF input signal at the first frequency, the first network coupled from the output of the first amplifier back to the input of the first amplifier;
    a second active stability network operating at the second frequency that decreases the amount of radiated or conducted parasitic cellular signal between the first and the second antenna by combining a second stabilization signal that at least partially compensates for the parasitic cellular signal with a second RF input signal at the second frequency, the second network coupled from the output of the second amplifier back to the input of the second amplifier; and
    an RF circuit board comprising a ground plane interposed between the first and the second antenna at controlled distances and reflecting RF power from the antennas, and the RF circuit board further comprising a common microcontroller adjusting both the first and the second stabilization signals.

2. The cellular telephone signal booster system as defined in claim 1, wherein the first active stability network comprises:
    an RF sample coupler that produces a sampled RF signal responsive to the local outgoing cellular signal provided to the second antenna;
    a vector modulator that receives the sampled RF signal and that produces a vector modulated signal;
    at least one band pass filter that receives the vector modulated signal and that produces a band pass filtered signal;
    an RF combining coupler that combines the band pass filtered signal with the remote incoming cellular signal from the first antenna and with a parasitic coupled signal from the second antenna to produce a combined signal;
    an attenuator that selectively attenuates the combined signal and that provides a selectively attenuated signal to the input of the first RF amplifier;
    an RF detection circuit that monitors the output of the first RF amplifier to detect the power output of the first RF amplifier; and
    the microcontroller responsive to the output of the RF detection circuit that adjusts the active stability network to minimize the effect of the parasitic coupled signal on the output of the first RF amplifier.

3. The cellular telephone signal booster system as defined in claim 1, wherein the second active stability network comprises:
    an RF sample coupler that produces a sampled RF signal responsive to the remote outgoing cellular signal provided to the first antenna;
    a vector modulator that receives the sampled RF signal and that produces a vector modulated signal;
    at least one band pass filter that receives the vector modulated signal and that produces a band pass filtered signal;
    an RF combining coupler that combines the band pass filtered signal with the local incoming cellular signal from the second antenna and with a parasitic coupled signal from the first antenna to produce a combined signal;
    an attenuator that selectively attenuates the combined signal and that provides a selectively attenuated signal to the input of the second RF amplifier;
    an RF detection circuit that monitors the output of the second RF amplifier to detect the power output of the second RF amplifier; and
    the microcontroller responsive to the output of the RF detection circuit that adjusts the active stability network to minimize the effect of the parasitic coupled signal on the output of the second RF amplifier.

4. The cellular telephone signal booster system as defined in claim 1, wherein:
    the first active stability network comprises:
        a first RF sample coupler that produces a first sampled RF signal responsive to the local outgoing cellular signal provided to the second antenna;
        a first vector modulator that receives the first sampled RF signal and that produces a first vector modulated signal;
        at least a first band pass filter that receives the first vector modulated signal and that produces a first band pass filtered signal;
        a first RF combining coupler that combines the first band pass filtered signal with the remote incoming cellular signal from the first antenna and with a first parasitic coupled signal from the second antenna to produce a first combined signal;
        a first attenuator that selectively attenuates the first combined signal and that provides a first selectively attenuated signal to the input of the first RF amplifier;
        a first RF detection circuit that monitors the output of the first RF amplifier to detect the power output of the first RF amplifier; and
        a first controller responsive to the output of the first RF detection circuit that adjusts the first active stability network to minimize the effect of the first parasitic coupled signal on the output of the first RF amplifier; and
    the second active stability network comprises:

a second RF sample coupler that produces a second sampled RF signal responsive to the remote outgoing cellular signal provided to the first antenna;

a second vector modulator that receives the second sampled RF signal and that produces a second vector modulated signal;

at least a second band pass filter that receives the second vector modulated signal and that produces a second band pass filtered signal;

a second RF combining coupler that combines the second band pass filtered signal with the local incoming cellular signal from the second antenna and with a second parasitic coupled signal from the first antenna to produce a second combined signal;

a second attenuator that selectively attenuates the second combined signal and that provides a second selectively attenuated signal to the input of the second RF amplifier;

a second RF detection circuit that monitors the output of the second RF amplifier to detect the power output of the second RF amplifier; and a second controller responsive to the output of the second RF detection circuit that adjusts the second active stability network to minimize the effect of the second parasitic coupled signal on the output of the second RF amplifier.

5. The cellular telephone signal booster system as defined in claim 4, wherein the first controller and the second controller comprise respective control programs in the common microcontroller.

6. The cellular telephone signal booster system as defined in claim 4, wherein the first controller and the second controller comprise respective control programs in a single common microcontroller.

7. A system for providing a stable gain for a cellular telephone signal booster between a receiving antenna and a transmitting antenna, comprising:

an RF amplifier that provides amplified output signals to the transmitting antenna in response to RF input signals received via the receiving antenna; and an active stability network that decreases the amount of radiated or conducted parasitic cellular signal between the receiving and the transmitting antenna by combining a band pass filtered signal with the RF input signals, the network coupled from the output of the amplifier back to the input of the amplifier, the active stability network comprising:

an RF sample coupler that samples the amplified output signals and produces a sampled RF signal;

a vector modulator that receives the sampled RF signal and produces a vector modulated signal;

at least one band pass filter that receives the vector modulated signal and that produces a band pass filtered signal that represents a stabilization signal that at least partially compensates for the radiated or conducted parasitic cellular signal;

an RF combining coupler that combines the band pass filtered signal with an incoming RF signal that includes the parasitic cellular signal to produce a combined signal;

a variable attenuator that selectively attenuates the combined signal and provides a selectively attenuated signal to the input of the RF amplifier;

an RF detection circuit that monitors the output of the RF amplifier to detect the power output of the RF amplifier; and a controller responsive to the output of the RF detection circuit that selectively adjusts the vector modulator and the variable attenuator to minimize the effect of the parasitic coupled cellular signal; and an RF circuit board comprising a ground plane interposed between the receiving and the transmitting antenna at controlled distances and reflecting RF power from the antennas, and the RF circuit board further comprising active stability network.

8. The system for providing a stable gain for a cellular telephone signal booster as defined in claim 7, wherein the controller comprises a microcontroller that receives an input signal responsive to the magnitude of the output of the RF amplifier and that incrementally adjusts at least one control input of the vector modulator to adjust the phase of the vector modulated signal, and is further responsive to the magnitude of the RF amplifier to adjust a control input to the variable attenuator to selectively attenuate the amplitude of the combined signal.

9. A method of providing a stable gain for a cellular telephone booster by decreasing the amount of radiated or conducted parasitic cellular signal coupled from the output of an amplifier back to the input of the amplifier, the method comprising:

positioning an RF circuit board comprising a ground plane between a receiving and a transmitting antenna at controlled distances and that reflect RF power from the antennas, and the RF circuit board further a microcontroller;

sampling the output of the amplifier using an RF sample coupler to produce a sampled signal;

applying vector modulation to the sampled signal to produce a vector modulated signal;

band pass filtering the sampled signal to produce a band pass filtered signal that represents a stabilization signal, which at least partially compensates for the radiated or conducted parasitic cellular signal;

combining the band passed filtered signal with an input signal to produce a combined signal;

applying a selective attenuation to the combined signal to provide an attenuated signal;

providing the attenuated signal as the input of the amplifier; and using the microcontroller to monitor the RF power output of the amplifier and adjust the vector modulation and the selective attenuation in response to the RF power output to minimize the amount of parasitic coupled cellular signal.

10. The method of providing a stable gain for a cellular telephone booster defined in claim 9, further comprising:

applying an initial selective attenuation to a variable attenuator;

applying an initial in-phase (I) value to a vector modulator;

applying an initial quadrature (Q) value to the vector modulator;

determining an expected RF power output;

comparing a detected RF power output to the expected RF power output;

when the detected RF power output differs from the expected RF power output by more than a predetermined amount:

incrementally adjusting the in-phase value within a predetermined range about the initial in-phase value and detecting the RF power for each in-phase value until the detected RF power no longer differs from the expected RF power by more than the predetermined amount or until the in-phase value is outside the predetermined range;

when the in-phase value is outside the predetermined range, incrementally adjusting the quadrature value within a predetermined range about the initial quadrature value and repeating the incremental adjusting of the in-phase value within the predetermined range about the initial in-phase value until the detected RF power no longer differs from the expected RF power by more than the predetermined amount or until the quadrature value is outside the predetermined range; and adjusting the selective attenuation to a new attenuation when the detected RF power differs by more than the predetermined amount for all values of the in-phase value and the quadrature value within the respective predetermined ranges of value, and repeating the incremental adjusting of the in-phase value and the quadrature value at the new attenuation; and when the detected RF power output does not differ from the expected RF power by more than a predetermined amount, delaying for a predetermined time and then adjusting the attenuation to a new attenuation value and repeating the adjusting of the in-phase value and the adjusting of the quadrature value at the new attenuation value.

* * * * *